United States Patent
Arai et al.

(10) Patent No.: US 9,249,969 B2
(45) Date of Patent: Feb. 2, 2016

(54) CLOTHING ILLUMINATION DEVICE AND CLOTHING ILLUMINATION SYSTEM

(71) Applicant: Rohm Co., Ltd., Kyoto (JP)

(72) Inventors: Katsuhiro Arai, Kyoto (JP); Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 114 days.

(21) Appl. No.: 14/108,429

(22) Filed: Dec. 17, 2013

(65) Prior Publication Data

US 2014/0175989 A1  Jun. 26, 2014

(30) Foreign Application Priority Data

Dec. 21, 2012 (JP) .................................. 2012-279220
Jan. 24, 2013 (JP) .................................. 2013-11134

(51) Int. Cl.
| | |
|---|---|
| *H05B 37/02* | (2006.01) |
| *F21V 33/00* | (2006.01) |
| *F21V 9/10* | (2006.01) |
| *H05B 33/08* | (2006.01) |
| *F21V 9/06* | (2006.01) |
| *F21W 131/40* | (2006.01) |
| *F21W 131/405* | (2006.01) |
| *F21Y 113/00* | (2006.01) |

(52) U.S. Cl.
CPC . *F21V 33/00* (2013.01); *F21V 9/10* (2013.01); *H05B 33/0872* (2013.01); *F21V 9/06* (2013.01); *F21W 2131/40* (2013.01); *F21W 2131/405* (2013.01); *F21Y 2113/005* (2013.01); *H05B 37/0227* (2013.01); *H05B 37/0272* (2013.01)

(58) Field of Classification Search
USPC .................................................. 315/149–159
See application file for complete search history.

(56) References Cited

U.S. PATENT DOCUMENTS

| | | | | |
|---|---|---|---|---|
| 4,091,441 | A * | 5/1978 | Ott | 362/1 |
| 6,528,954 | B1 * | 3/2003 | Lys et al. | 315/291 |
| 8,648,546 | B2 * | 2/2014 | Van De Ven et al. | 315/294 |
| 2002/0113555 | A1 * | 8/2002 | Lys et al. | 315/149 |
| 2008/0048567 | A1 * | 2/2008 | Steele et al. | 315/151 |
| 2010/0264835 | A1 * | 10/2010 | Bilenko et al. | 315/152 |
| 2012/0074850 | A1 * | 3/2012 | Tanaka et al. | 315/152 |
| 2012/0084126 | A1 * | 4/2012 | Zampini et al. | 705/14.4 |
| 2012/0206050 | A1 * | 8/2012 | Spero | 315/152 |
| 2013/0193854 | A1 * | 8/2013 | Nesensohn | 315/151 |
| 2014/0167618 | A1 * | 6/2014 | Wang | 315/152 |
| 2014/0265882 | A1 * | 9/2014 | Laski et al. | 315/158 |
| 2015/0069918 | A1 * | 3/2015 | Trattler | 315/151 |

FOREIGN PATENT DOCUMENTS

JP  2012-113855  6/2012

* cited by examiner

*Primary Examiner* — Brandon S Cole
(74) *Attorney, Agent, or Firm* — Fish & Richardson P.C.

(57) ABSTRACT

A clothing illumination device is switchable between illumination with visible light only and illumination with visible light mixed with ultraviolet light. The clothing illumination device also has an LED light source and an IC tag reader. A clothing illumination system has a first and a second clothing illumination device which are each switchable between illumination with visible light only and illumination with visible light mixed with ultraviolet light, and which operate in a fashion coordinated with each other to perform the switching.

20 Claims, 13 Drawing Sheets

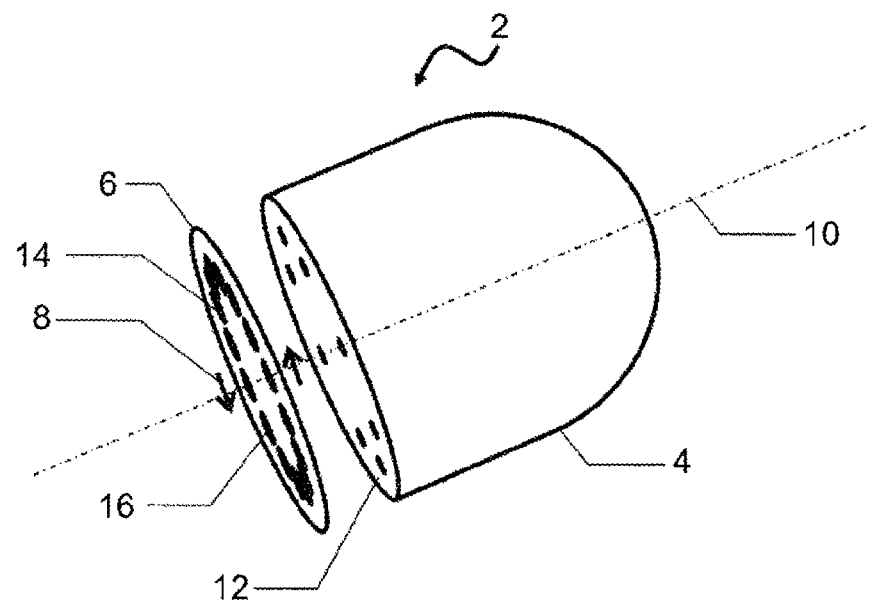
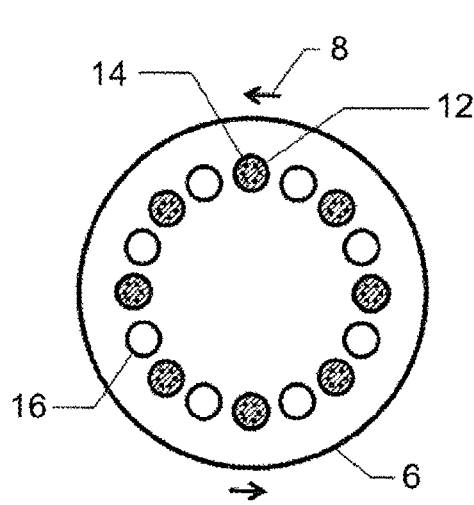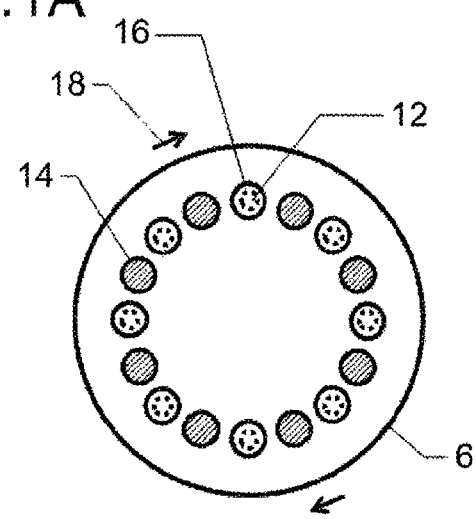
FIG.1A
FIG.1B   FIG.1C

US 9,249,969 B2

CLOTHING ILLUMINATION DEVICE AND CLOTHING ILLUMINATION SYSTEM

CROSS-REFERENCE TO RELATED APPLICATIONS

This application is based on the following Japanese patent applications, the contents of which are hereby incorporated by reference:
(1) Japanese Patent Application No. 2012-279220 (filed on Dec. 21, 2012)
(2) Japanese Patent Application No. 2013-011134 (filed on Jan. 24, 2013)

BACKGROUND OF THE INVENTION

1. Field of the Invention

The present invention relates to clothing illumination devices and clothing illumination systems.

2. Description of Related Art

There are conventionally proposed a variety of illumination devices and illumination systems for illumination of merchandise. Also proposed is the use of LEDs as light sources for illumination of merchandise. For example, according to one proposal, for illumination of a ceiling surface and display shelves with proper light, while the ceiling surface, which has a large area, is illuminated with an upward illuminating LED light source to enhance perceived lightness in an entire space, merchandise or the like on the display shelves is illuminated brightly with a downward illuminating LED light source which illuminates downward over a small area without illuminating passages between the display shelves (see, for example, Japanese Patent Application Publication No. 2012-113855).

However, in connection with clothing illumination devices and clothing illumination systems, many problems still remain to be addressed.

SUMMARY OF THE INVENTION

Against the above background, the present invention aims to provide more useful clothing illumination devices and clothing illumination systems.

According to one aspect of the present invention, a clothing illumination device is configured to be capable of switching between illumination with visible light only and illumination with visible light mixed with ultraviolet light. The clothing illumination device may be provided with an LED light source and an IC tag reader. According to another aspect of the present invention, a clothing illumination system is provided with a first and a second clothing illumination device which are each configured to be capable of switching between illumination with visible light only and illumination with visible light mixed with ultraviolet light, and which operate in a fashion coordinated with each other to perform the switching.

These and other features, elements, steps, benefits, and characteristics of the present invention will become apparent upon further review of the following detailed description of preferred embodiments with reference to the accompanying drawings.

BRIEF DESCRIPTION OF THE DRAWINGS

FIG. 1A is a perspective view, and FIGS. 1B and 1C are front views, of a clothing illumination device according to Example 1 of the present invention;

DETAILED DESCRIPTION OF PREFERRED EMBODIMENTS

EXAMPLE 1

Figure 2A:
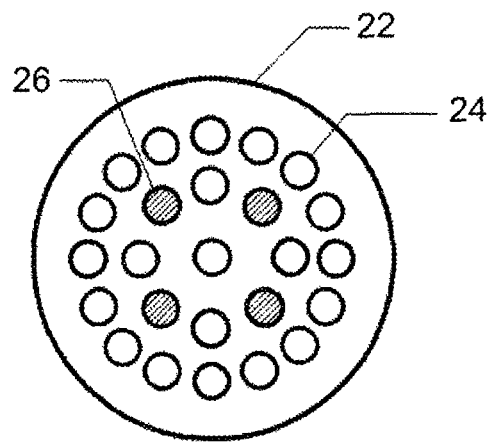
FIG. 2A is a front view.

FIG. 1A, 1B, and 1C show a clothing illumination device according to a first example (Example 1) of the present invention. FIG. 1A is a perspective view of the clothing illumination device 2, which has a main body 4 and a rotary filter disk 6. In FIG. 1A, for the sake of explanation, the main body 4 and the rotary filter disk 6 are shown apart from each other; in reality, the rotary filter disk 6 is arranged in contact with the front face of the main body 4, and is rotatable about a center axis 10 as indicated by arrows 8.

In the front face of the main body 4, an LED group 12 comprising a plurality LEDs is arranged with the LEDs located in rotational symmetry about the center axis 10. Each LED of the LED group 12 emits illumination light ranging from visible region to ultraviolet region. On the other hand, in the rotary filter disk 6, an ordinary illumination filter group 14 comprising a plurality of filters 14 that transmit light in visible region only and a white clothing illumination filter group 16 comprising a plurality of filters that transmit light ranging from visible region to ultraviolet region are arranged with the filters of the former and the filters of the latter located alternately in rotational symmetry about the center axis 10. By rotating the rotary filter disk 6 about the center axis 10, it is possible to switch between a state where the filters of the ordinary illumination filter group 14 are located in front of all the LEDs of the LED group 12 and a state where the filters of the white clothing illumination filter 16 are located in front of all the LEDs of the LED group 12.

Clothing includes colored clothes, i.e., clothes dyed with dyes, and white clothes. White clothes are usually treated with fluorescent (whitening) agents to prevent their materials, such as cotton, from exhibiting their natural (raw) colors so that, on exposure to ultraviolet light, they appear pure white. Common light from the sun and fluorescent lamps naturally contains ultraviolet light, and this permits white clothes treated as mentioned above to appear pure white as intended.

By contrast, LED illumination can be configured to emit light in visible region only. This is advantageous to clothing in general because it helps prevent colored clothes from fading. For example, it is known that displaying dark-colored men's clothes for an excessively long period under bright ordinary illumination in sales spaces causes them to fade due to ultraviolet light to such an extent that they eventually have to be discarded. This problem is alleviated with LED illumination configured to emit light in visible region only.

Inconveniently, however, when white clothes are illuminated with an LED illumination device configured to emit light in visible region only, despite containing fluorescent agents, they exhibit their unbleached colors in sales spaces, diminishing customers' buying appetite. Even so, configuring the LED illumination device to emit light also in ultraviolet region as is conventionally common spoils the advantage of LED illumination, making it impossible to prevent colored clothes from fading.

As a solution, Example 1 described above offers a configuration where, by rotating the rotary filter disk 6, it is possible to switch between a state where light in visible region only is emitted for colored clothes and a state where both light in visible region and light in ultraviolet region are emitted for white clothes. FIGS. 1B and 1C are front views of the rotary filter disk 6 in illustration of the switching, and show the positional relationship between the ordinary illumination filter group 14 and the white clothing illumination filter group 16 along with the LED group 12.

FIG. 1B shows the state where the filters of the ordinary illumination filter group 14 are located in front of all LEDs of the LED group 12. In this state, the ultraviolet light component emitted from the LED group 12 is filtered out so that light in visible region only is emitted. In a situation where colored clothes are placed on a display shelf or the like in the illumination range of the clothing illumination device 2, by setting the clothing illumination device 2 into the state shown in FIG. 1B, it is possible to prevent colored clothes from fading.

On the other hand, FIG. 1C shows a state that results when, from the state shown in FIG. 1B, the rotary filter disk 6 is rotated one filter position in the direction indicated by arrows 8, that is, the state where the filters of the white clothing illumination filter group 16 are located in front of all the LEDs of the LED group 12. In this state, the ultraviolet light component emitted from the LED group 12 too is transmitted through the white clothing illumination filter group 16 and is emitted together with light in visible region. In a situation where white clothes are placed on a display shelf or the like in the illumination range of the clothing illumination device 2, by setting the clothing illumination device 2 into the state shown in FIG. 1C, it is possible to allow ultraviolet light to act on fluorescent agents so that the white clothes appear pure white as intended. Since white clothes basically do not contain dyes or the like, fading is unlikely to pose a problem. Incidentally, a return from the state shown in FIG. 1C to the state shown in FIG. 1B can be made by rotating the rotary filter disk 6 one filter position in the direction indicated by arrows 18. In Example 1, the filters of the ordinary illumination filter group 14 and the filters of the white clothing illumination filter group 16 are arranged alternately, in a cyclic fashion with one of the former adjacent to one of the latter. Thus, rotating the rotary filter disk 6 one more filter position in the direction indicated by arrows 8 can also achieve a return from the state shown in FIG. 1C to the state shown in FIG. 1B.

Incidentally, in Example 1, in a case where the LED group 12 itself is so configured that the mix ratio of the illumination light in ultraviolet region that is emitted together with illumination light in visible region is suitable for illumination of white clothes, the white clothing illumination filter group 16 in the rotary filter disk 6 may be omitted, with simple holes formed at the positions corresponding to its filters in the rotary filter disk 6.

The rotary filter disk 6 can be rotated manually. Instead, it may be configured to be operable with a driving force source such as a motor or a solenoid actuator so that controlling the driving force source enables the rotary filter disk 6 to rotate. This configuration allows electrical control by means of a signal, and thus makes wired or wireless remote operation possible, finding application in illumination equipment installed out of users' reach, such as ceiling lights.

EXAMPLE 2

Figure 2B:
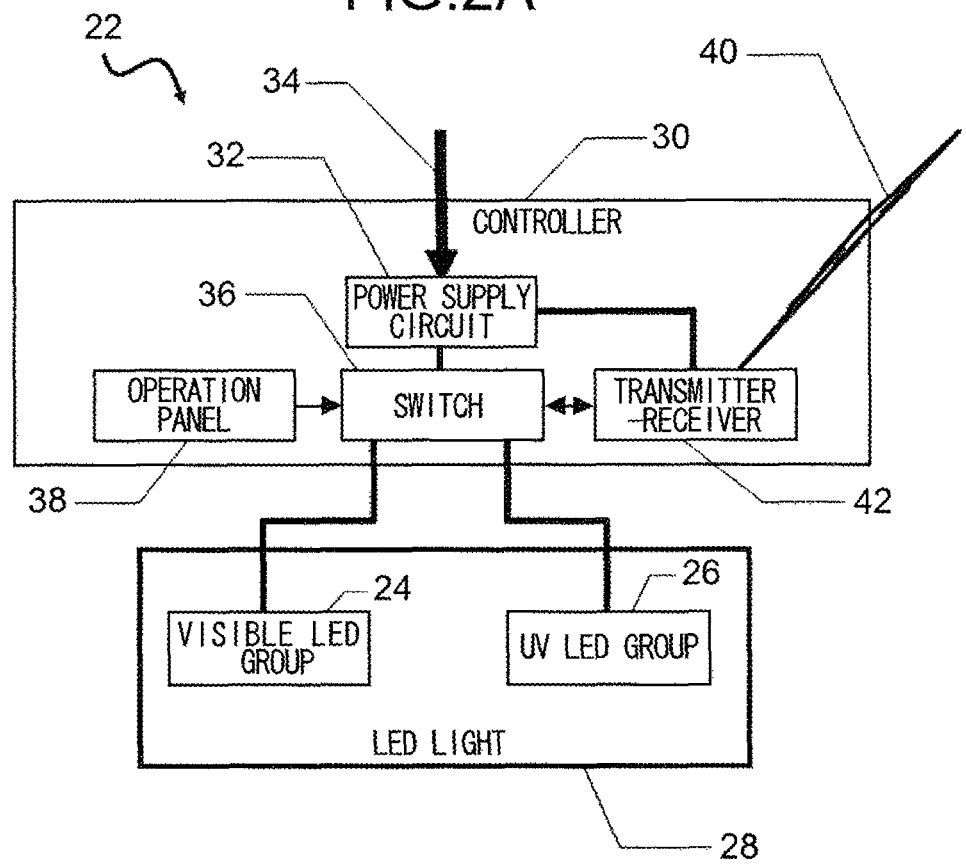
FIG. 2B is a block diagram, of a clothing illumination device according to Example 2 of the present invention.

FIGS. 2A and 2B show a clothing illumination device according to a second example (Example 2) of the present invention. FIG. 2A is a front view of the clothing illumination device 22 according to Example 2. The clothing illumination device 22 of Example 2 has an external appearance similar to that of the main body 4 in Example 1 shown in FIGS. 1A-1C, and therefore no perspective view is given here. FIG. 2A shows an LED group comprising a plurality of LEDs arranged in the clothing illumination device 22, including a visible (visible-light) LED group 24 comprising a comparatively large number of LEDs which emit light in visible region only and an ultraviolet (ultraviolet-light) LED group 26 comprising a comparatively small number of LEDs which correspond to so-called black lights. In a situation where colored clothes are placed on a display shelf or the like in the illumination range of the clothing illumination device 22, only the visible LED group 24 is lit; in a situation where white clothes are placed on a display shelf or the like in the illumination range of the clothing illumination device 22, both the visible LED group 24 and the ultraviolet (UV) LED group 26 are lit. In this way, as in Example 1, it is possible to prevent colored clothes from fading and to allow white clothes to appear pure white as intended.

Incidentally, in Example 2, if it is required that the average brightness with which white clothes are illuminated be higher than the average brightness with which colored clothes are illuminated, the ultraviolet LED group 26 may be replaced with an ultraviolet-mixed (ultraviolet light-mixed) LED group comprising LEDs that emit illumination light ranging from visible region to ultraviolet region as in Example 1. In that case, when both the visible LED group 24 and the ultraviolet-mixed LED group are lit, not only is illumination light in ultraviolet region mixed, but also the illumination light in visible region is intensified.

FIG. 2B is a block diagram of the clothing illumination device 22 of Example 2, separately showing a portion constituting an LED light 28 and a portion constituting a controller 30. The LED light 28 includes the visible LED group 24 and the ultraviolet LED group 26 shown in FIG. 2A, and the controller 30 controls their lighting.

In the controller 30, a power supply circuit 32 is supplied with electric power across a power line, and a switch (Sw) 36 allows selection of whether to light the visible LED 24 group only, to light both the visible LED group 24 and the ultraviolet LED group 26, or to light neither. The switch 36 may be controlled via an operation panel 38, which can be operated manually, or may be remote-controlled wirelessly from outside via a transmitter-receiver 42, which transmits and receives a remote control signal in the form of infrared rays or short range radio waves.

EXAMPLE 3

Figure 3:
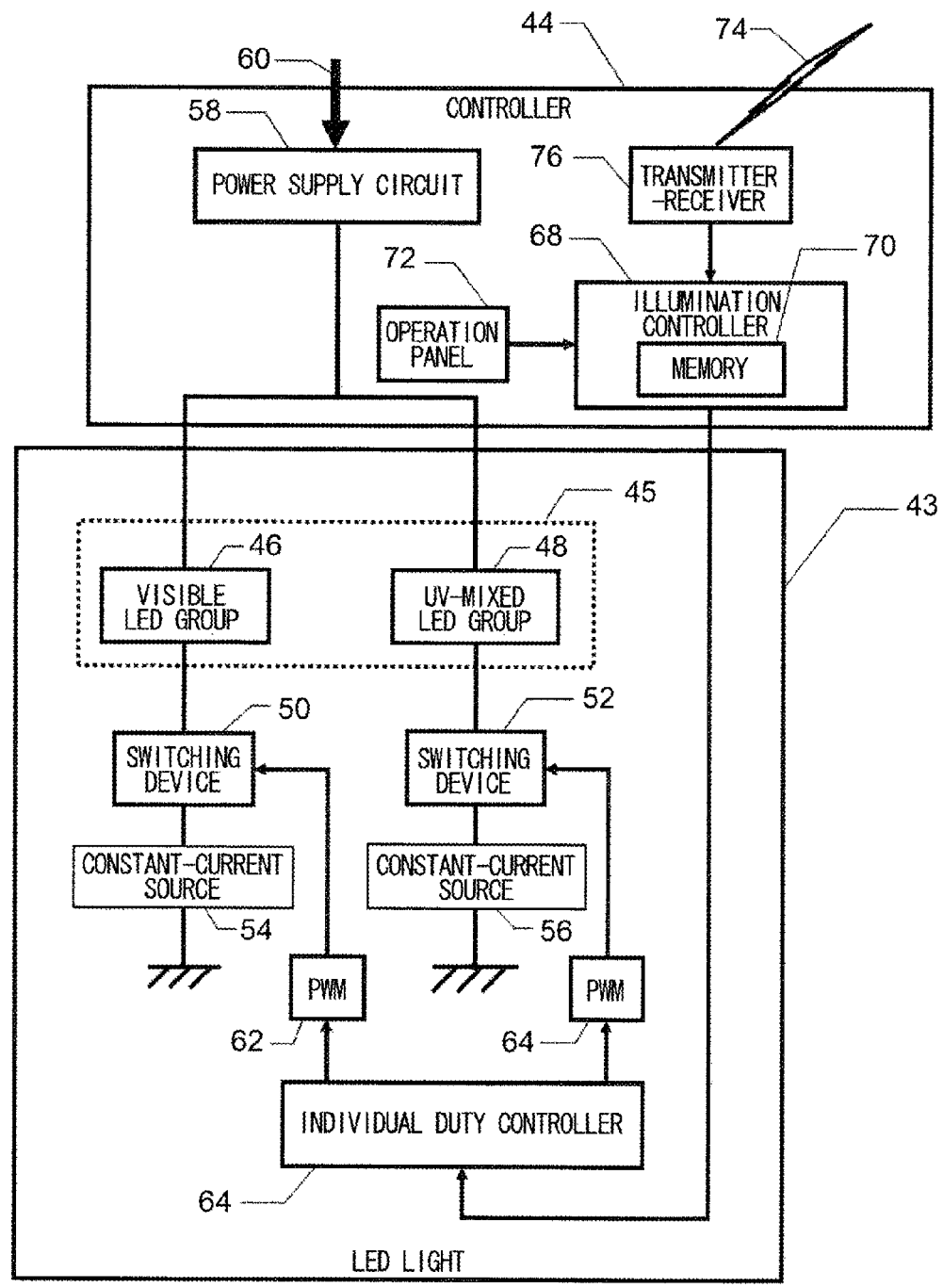
FIG. 3 is a block diagram of a clothing illumination device according to Example 3 of the present invention.

FIG. 3 is a block diagram of a clothing illumination device according to a third example (Example 3) of the present invention, separately showing a portion constituting an LED light 43 and a portion constituting a controller 44. Example 3 allows not only turning on and off of illumination but also so-called dimming control, allowing continuous control of overall brightness as well as the mix ratio of illumination light in visible region and illumination light in ultraviolet region. In Example 3, the LED light 43 has an LED group 45, which includes a visible LED group 46 comprising LEDs that emit illumination light in visible region only and an ultraviolet-mixed LED group 48 comprising LEDs that emit illumination light ranging from visible region to ultraviolet region. The visible LED group 46 and the ultraviolet-mixed LED group 48 are respectively connected via switching devices 50 and 52 to constant-current sources 54 and 56. Moreover, the visible LED group 46 and the ultraviolet-mixed LED group 48 are supplied with electric power across a power line 60 via a power supply circuit 58 in the controller 44.

In the configuration described above, by controlling the switching devices 50 and 52 separately, the lighting condition of the visible LED group 46 and the ultraviolet-mixed LED group 48 can be controlled separately. The switching devices 50 and 52 are respectively pulse-driven by PWM controllers 62 and 64, and by varying their respective duty cycles in PWM control between 100% to 0%, the visible LED group 46 and the ultraviolet-mixed LED group 48 can be dimmed, that is, their brightness can be adjusted, independently between a fully lit state and an extinguished state.

The duty cycles given separately to the PWM controllers 62 and 64 are controlled by an individual duty controller 66. The individual duty controller 66 is controlled by an illumination controller 68 in the controller 44. The illumination controller 68 is provided with a memory 70, in which can be selectably stored a plurality of preset combinations of the mix ratio of visible and ultraviolet light and the overall brightness as results of control of the brightness of the visible LED group 46 and the ultraviolet-mixed LED group 48. For example, when the duty cycle of the ultraviolet-mixed LED group 48 is set at zero, illumination suitable for colored clothes is obtained. Starting with this state, varying the duty cycle of the visible LED group 46 permits adjustment of the brightness of the illumination for colored clothes. On the other hand, with the duty cycle of the visible LED group 46 held constant, varying the duty cycle of the ultraviolet-mixed LED group 48 permits adjustment of the mix ratio of the ultraviolet light component. For example, with the mix ratio of the ultraviolet light component set low, a display shelf with colored and white clothes mixedly placed on it can be illuminated in a neutral manner.

Incidentally, the mix ratio of the ultraviolet light component can also be adjusted, with the duty cycle of the ultraviolet-mixed LED group 48 held constant, by varying the duty cycle of the visible LED group 46. Any combination of a duty cycle of the visible LED group 46 and a duty cycle of the ultraviolet-mixed LED group 48 can be arbitrarily preset and selected according to the desired overall brightness and the target of illumination. The illumination controller 68 may be controlled via an operation panel 72, which can be operated manually, or via a transmitter-receiver 76, which receives a remote control signal 74.

EXAMPLE 4

Figure 4:
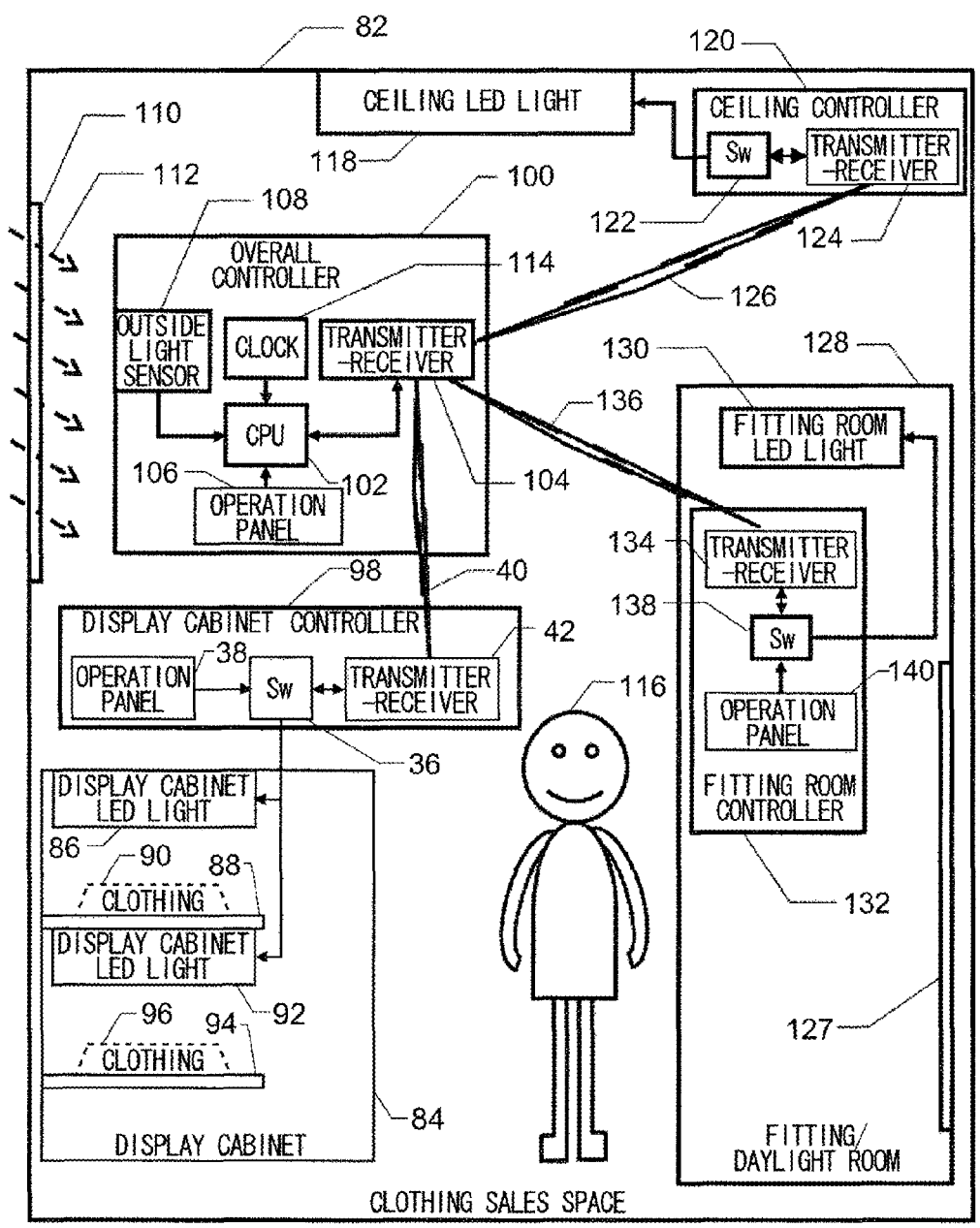
FIG. 4 is a block diagram of a clothing illumination system according to Example 4 of the present invention.

FIG. 4 is a block diagram of Example 4 of the present invention, and shows a clothing illumination system to which clothing illumination devices etc. according to the examples shown in FIGS. 1A-1C through 3 can be applied. The following description of Example 4 deals with, as an example, a case where the clothing illumination device 22 according to Example 2 shown in FIG. 2 is applied. Accordingly, such parts as find their counterparts in FIG. 2 are identified by common reference signs, and no overlapping description will be repeated unless necessary. To the clothing illumination system of Example 4, not only Example 2 shown in FIG. 2, but any of the examples shown in FIGS. 1A-1C through 3 or any other similar implementation may be applied. This is true equally with any example other than Example 4 which will be described later.

Example 4 shown in FIG. 4 is configured as a clothing sales space 82. On the bottom side of the top plate of a display cabinet 84, a display cabinet LED light 86 similar to the LED light 28 in FIG. 2 is arranged so as to illuminate clothes 90 placed on a display shelf 88. On the bottom side of the display shelf 88, a display cabinet LED light 92 is arranged so as to illuminate clothes 96 placed on a display shelf 94. The display cabinet LED lights 86 and 92 are controlled by a display cabinet controller 98 similar to the controller 30 in Example 2 shown in FIG. 2. In the display cabinet controller 98, for simplicity's sake, the power supply circuit 32 is omitted from illustration. The display cabinet LED lights 86 and 92 allow choice of whether or not to light the ultraviolet LED group 26 according to whether the clothes 90 and 96 are colored or white. In FIG. 4, for simplicity's sake, a switch 36 common to the display cabinet LED lights 86 and 92 is shown; in reality, to allow choice of whether or not to mix ultraviolet light for each of the display shelves 88 and 94, each of the display cabinet LED lights 86 and 92 is provided with a switch dedicated to its control. This will be mentioned also in connection with an example described later.

An overall controller 100 is provided with a CPU 102 for controlling illumination in the clothing sales space 82 in a concentrated fashion. For control of illumination in the display cabinet 84, under the control of the CPU 102, a remote control signal 40 from a transmitter-receiver 104 is transmitted to a transmitter-receiver 42 in the display cabinet controller 98. Also in response to operation on an operation panel 106, which can be operated manually, the CPU 102 can transmit a remote control signal 40 from the transmitter-receiver 104.

As described above, for example, illumination in the display cabinet 84 can be controlled according to a remote control signal 40 based on manual operation. Next, automatic control by the CPU 102 will be described. The overall controller 100 is provided with an outside light sensor 108, and detects whether or not outside light 112 containing natural ultraviolet light is shining in through a window 110. If a predetermined amount or more of outside light is shining in, no ultraviolet light needs to be emitted from the display cabinet LED lights 86 and 92. Thus, even when the clothes 90 and 96 are white clothes, emission of ultraviolet light from the display cabinet LED lights 86 and 92 is automatically stopped.

Next, automatic illumination control based on time will be described. The overall controller 100 is provided with a clock 114, and based on information from the clock 114, the CPU 102 automatically stops emission of ultraviolet light from the display cabinet LED lights 86 and 92 in the time zone before the start of and after the end of the opening hours (business hours) of the clothing sales space 82. In a case where no customer 116 but only a clerk is present in the clothing sales space 82, even white clothes do not need to be displayed to appear pure white. Accordingly, as described just above, outside the opening hours, illumination containing ultraviolet light is stopped in order to prevent colored clothes from fading as when some happen to be mixed with white clothes in the illumination range where ultraviolet light is mixed. Needless to say, even with only a clerk present, whenever a check needs to be made as to how white clothes are illuminated, it is possible to switch to illumination mixed with ultraviolet light manually via the operation panel 38 or 106.

The overall controller 100 can also control a plurality of LED lights in the clothing sales space 82 in a coordinated fashion. For example, the overall controller 100 can control a ceiling LED light 118 in a fashion coordinated with the condition of the display cabinet 84. The ceiling LED light 118 and a ceiling controller 120 are configured similarly to their counterparts in the clothing illumination device 22 in FIG. 2; they can emit both illumination light in visible region and illumination light in ultraviolet region over the entire clothing sales space 82, and can be controlled to switch to illumination light in visible region only. In the ceiling controller 120 in FIG. 4, for simplicity's sake, an operation panel and a power supply circuit are omitted from illustration.

The ceiling LED light 118 illuminates a large area over the clothing sales space 82, and therefore colored and white clothes are likely to be present mixedly in its the illumination range. Accordingly, to prevent colored clothes from fading, the ceiling LED light 118 is usually so controlled as not to emit ultraviolet light but to emit illumination light in visible region only to illuminate the clothing sales space 82. At individual display shelves, illumination is controlled according to the type of clothes to be illuminated there; thus it is reasonable to illuminate white clothes with, for example, ultraviolet light emitted from the display cabinet LED lights 86 and 92 while illuminating the entire clothing sales space 82 with light in visible region only from the ceiling LED light 118.

However, when a customer 116 picks up a piece of clothing 90 from, for example, the display shelf 88, and it happens to be a white one, the piece of clothing 90 moves out of the range illuminated with the ultraviolet light from the display cabinet LED light 86 and exhibits its unbleached color. To cope with that, in Example 4 shown in FIG. 4, the display cabinet 84 is provided with an unillustrated pick-up sensor (which will be described in detail in connection with an example described later) so that, when a piece of clothing 90 is detected to have been picked up from the display shelf 88, a detection signal 40 is transmitted from the transmitter-receiver 42 in the display cabinet controller 98 to the transmitter-receiver 104 in the overall controller 100. When the transmitter-receiver 104 receives the detection signal 40, the CPU 102 transmits an instruction signal 126 from the transmitter-receiver 104 to a transmitter-receiver 124 in the ceiling controller 120 to control a switch 122 such that the ceiling LED light 118 is switched to emit both visible light and ultraviolet light. In this way, even when a customer 116 picks up a white piece of clothing 90, it is prevented from exhibiting its unbleached color. This is an example of how the overall controller 100 controls a plurality of LED lights in the clothing sales space 82 in a coordinated fashion.

The clothing sales space 82 further has a fitting/daylight room 128 furnished with a mirror 127. In the fitting/daylight room 128, a fitting room LED light 130 and a fitting room controller 132 that are configured similarly to their counterparts in the clothing illumination device 22 in FIG. 2. These can emit both illumination light in visible region and illumination light in ultraviolet region, and can be controlled to switch to illumination light in visible region only. In the fitting room controller 132 in FIG. 4, for simplicity's sake, a power supply circuit is omitted from illustration. In the fitting/daylight room 128, when a customer tries on a white piece of clothing, it is prevented from exhibiting its unbleached color, and in addition the client can check the colors of clothes under daylight.

Here, the point is to prevent a white piece of clothing 90 from exhibiting its unbleached color in the fitting/daylight room 128, and therefore the clothing sales space 82 may be so configured as to tolerate a white piece of clothing exhibiting its unbleached color after the customer 116 picks up the piece of clothing 90 from the display shelf 88 until she takes it into the fitting/daylight room 128. That is, the entire clothing sales space 82 is illuminated with light in visible region from the ceiling LED light 118 all the time, so that priority is given to prevention of fading of colored clothes in the clothing sales space 82. In this case, the switching capability of the ceiling LED light 118 may be omitted; that is, as the ceiling LED light 118, one configured to emit light in visible region only may be adopted.

More specifically, the fitting/daylight room 128 is controlled as follows. When a detection signal 40 indicating that a customer 116 has picked up a white piece of clothing 90 from the display shelf 88 is received by the transmitter-receiver 104 in the overall controller 100, the CPU 102 transmits an instruction signal 136 from the transmitter-receiver 104 to a transmitter-receiver 134 in the fitting room controller 132 to control a switch 138 such that the fitting room LED light 130 is switched to emit both visible light and ultraviolet light. Thus, when the customer 116 enters the fitting/daylight room 128 with the white piece of clothing 90, this is prevented from exhibiting its unbleached color. This is another example of how the overall controller 100 controls a plurality of LED lights in the clothing sales space 82 in a coordinated fashion.

The fitting room LED light 130 can be switched by manually operating the switch 138 on an operation panel 140 of the fitting room controller 132. In this case, when the switch 138 is so operated via the operation panel 140 as to switch the fitting room LED light 130 from a state emitting visible light only to a state emitting ultraviolet light as well, a report signal 136 is transmitted from the transmitter-receiver 134 to the transmitter-receiver 104 in the overall controller 100. When the transmitter-receiver 104 receives the report signal 136, the CPU 102 transmits an instruction signal 126 from the transmitter-receiver 104 to the transmitter-receiver 124 in the ceiling controller 120 to switch the ceiling LED light 118, if it is emitting both visible and ultraviolet light, to visible light only. That is, in a case where the ceiling LED light 118 is controlled to emit both visible and ultraviolet light to prevent a white piece of clothing 90 from exhibiting its unbleached color after being picked up from the display cabinet 84 until being taken into the fitting/daylight room 128, all this becomes unnecessary once the white piece of clothing 90 is taken into the fitting/daylight room 128. Accordingly, the ceiling LED light 118 is automatically switched via the switch 122 to restore illumination with visible light only. This is yet another example of how the overall controller 100 controls a plurality of LED lights in the clothing sales space 82 in a coordinated fashion. Incidentally, in this case, instead of the operation panel 140 being operated manually, a human presence sensor (which will be described in detail in connection with an example described later) may be provided so that the fitting room LED light 130 is switched automatically to illumination with ultraviolet light as well while the ceiling LED light 118 automatically restores illumination with visible light only.

EXAMPLE 5

Figure 5:
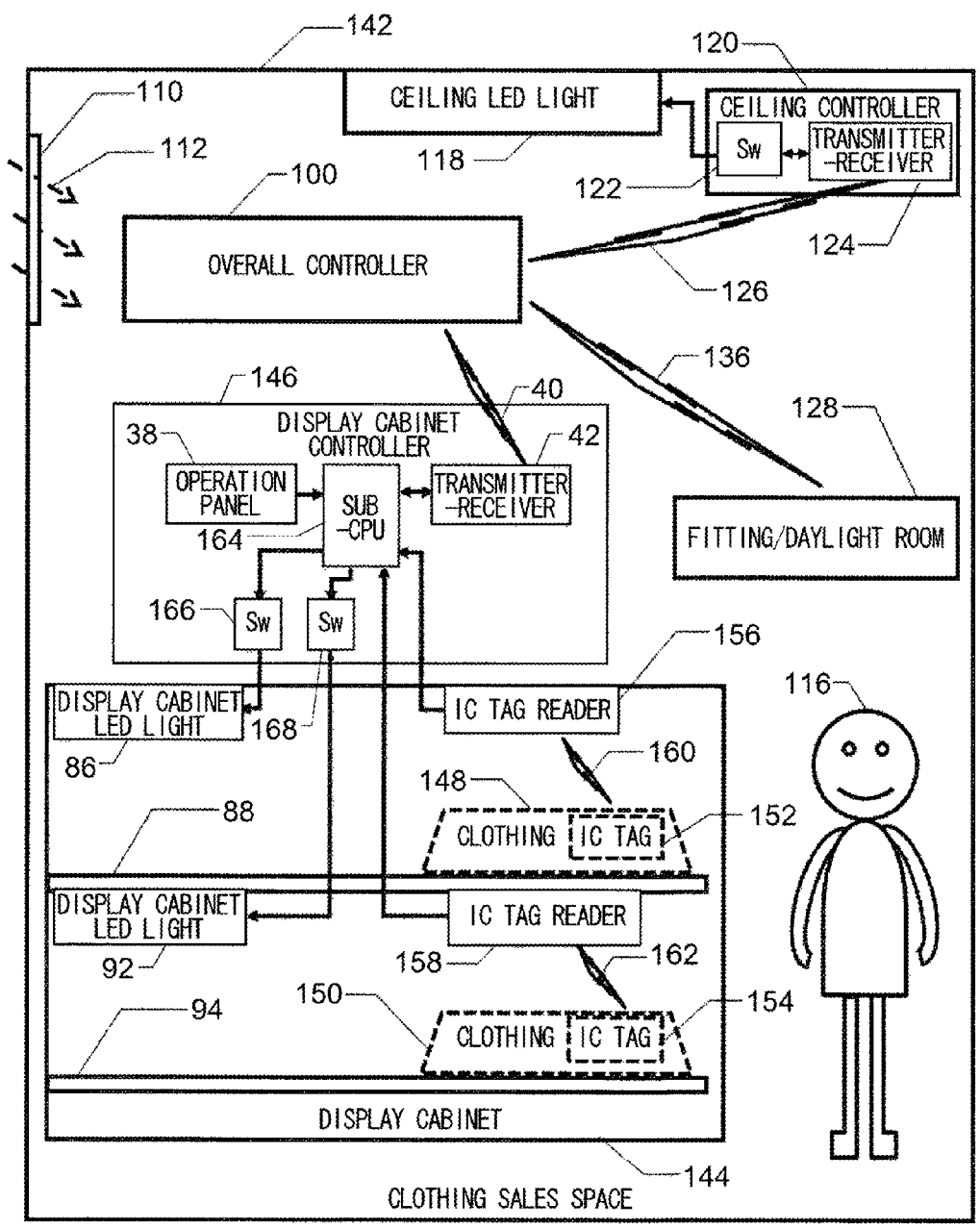
FIG. 5 is a block diagram of a clothing illumination system according to Example 5 of the present invention.

FIG. 5 is a block diagram of a fifth example (Example 5) of the present invention, and shows a clothing illumination system similar to that of Example 4 shown in FIG. 4. The clothing sales space 142 in Example 5 shown in FIG. 5 has much in common with the clothing sales space 82 in Example 4 shown in FIG. 4, and accordingly such parts as are common to them are identified by common reference signs, and no overlapping description will be repeated unless necessary. Moreover, the overall controller 100 and the fitting/daylight room 128 are configured to have the same details as described previously, and accordingly, in FIG. 5, the blocks inside them are omitted from illustration.

Example 5 shown in FIG. 5 differs from Example 4 shown in FIG. 4 in the configuration of a display cabinet 144 and a display cabinet controller 146. Additionally presented here is a specific means for automatically detecting whether clothes 148 and 150 placed on the display shelves 88 and 94 are colored or white and switching the display cabinet LED lights 86 and 92 between illumination with visible light only and illumination with ultraviolet light mixed. Also additionally presented here is a means for automatically detecting a piece of clothing 148 or 150 being picked up from the display shelf 88 or 94.

Specifically, each piece of clothing 148 or 150 is fitted with an IC tag 152 or 154, and an IC tag reader 156 or 158 discriminates whether a piece of clothing 148 or 150 fitted with an IC tag 152 or 154 is colored or white. The result of discrimination is transmitted to a sub-CPU 164, and the sub-CPU 164 controls a switch 166 or 168 to switch the display cabinet LED light 86 or 92 between illumination with visible light only and illumination with the ultraviolet light mixed. For example, when the IC tag reader 156 detects a piece of clothing 148 placed on the display shelf 88 being colored, the sub-CPU 164 controls the switch 166 such that the display cabinet LED light 86 emits visible light only. By contrast, when the IC tag reader 158 detects a piece of clothing 150 placed on the display shelf 94 being white, the sub-CPU 164 controls the switch 168 such that the display cabinet LED light 92 emits both visible and ultraviolet light.

As described above, in Example 5, the type of the clothes 148 and 150 placed on the display shelves 88 and 94 is automatically discriminated to select suitable illumination for each of the display shelves 88 and 84. Moreover, the IC tag readers 156 and 158 detect any of the clothes 148 and 150 being picked up from the display shelves 88 and 84, and the sub-CPU 164 notifies, from the transmitter-receiver 42, the overall controller 100 of the result of discrimination. On receiving the notification, the overall controller 100 instructs the ceiling controller 120 to add ultraviolet light to the illumination from the ceiling LED light 118 if the piece of clothing taken up is white, thereby achieving automatic control. For example, when a white piece of clothing 150 is taken up from the display shelf 94, the illumination from the ceiling LED light 118 is automatically switched such that both visible and ultraviolet light is emitted. By contrast, when a colored piece of clothing 148 is taken up from the display shelf 88, the illumination by the ceiling LED light 118 with visible light only is continued.

EXAMPLE 6

Figure 6:
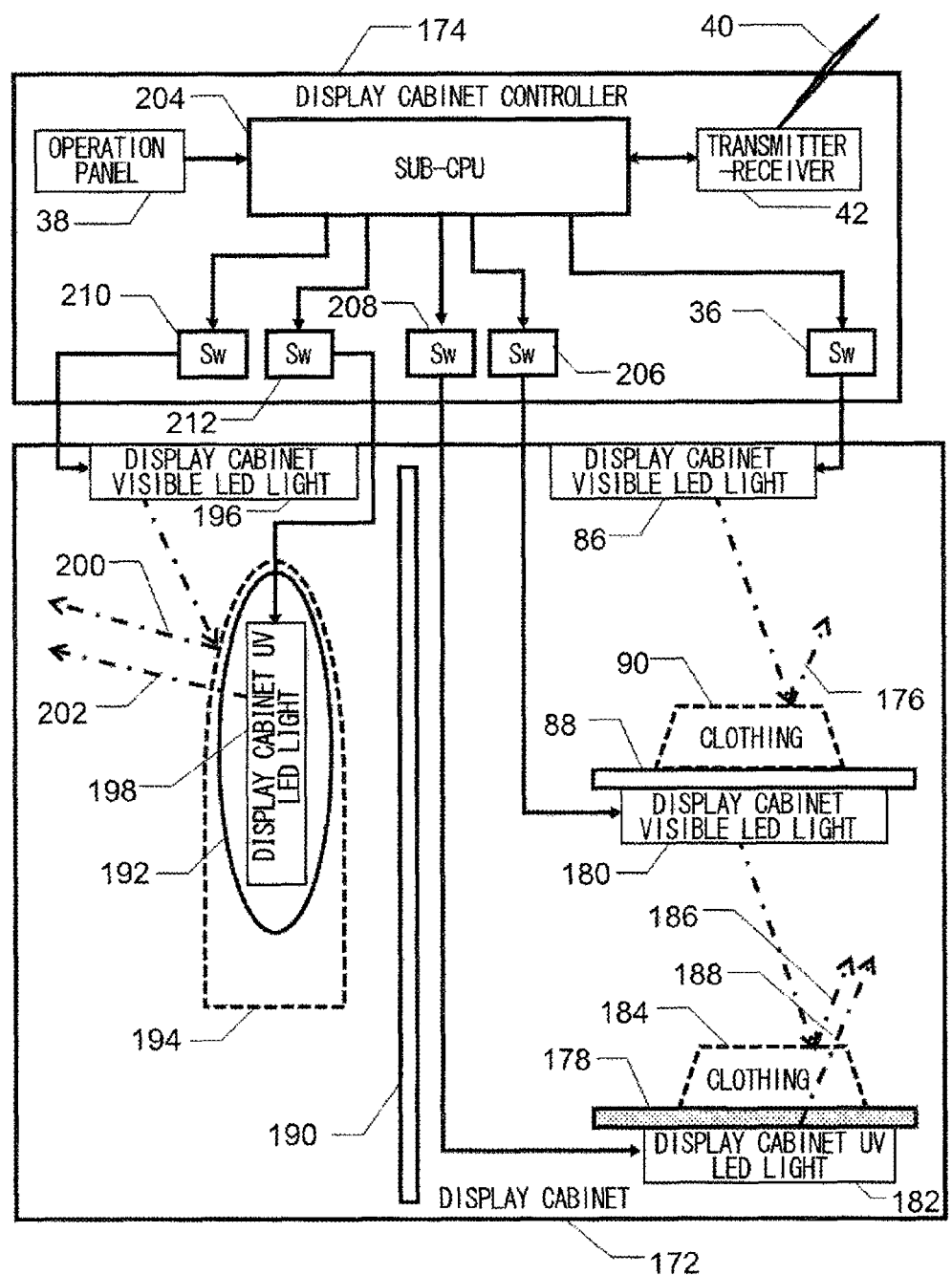
FIG. 6 is a block diagram of a clothing illumination system according to Example 6 of the present invention.

FIG. 6 is a block diagram of a sixth example (Example 6) of the present invention, and shows a clothing illumination system configured similarly to those in Examples 4 and 5 shown in FIGS. 4 and 5. Example 6 has much in common with Examples 4 and 5, and accordingly, in FIG. 6, the parts other than a display cabinet 172 and a display cabinet controller 174 are omitted from illustration and excluded from description. In those parts which are shown in FIG. 6, such parts as find their counterparts in FIGS. 4 and 5 are identified by common reference signs, and no overlapping description will be repeated unless necessary.

Example 6 shown in FIG. 6 differs from Examples 4 and 5 shown in FIGS. 4 and 5 in the following respect: when white clothes are irradiated with light in ultraviolet region, in Examples 4 and 5, the obverse side of clothes is irradiated with light in ultraviolet region to produce fluorescence in the direction in which the light is reflected; in Example 6, by contrast, the reverse side of clothes is irradiated with light in ultraviolet region to produce fluorescence in the direction in which the light is transmitted.

Specifically, the illumination at the display shelf 88 is the same as in the example shown in FIG. 4: when the clothes 90 placed on the display shelf 88 is white, owing to the ultraviolet light contained in the illumination light from the display cabinet LED light 86, the fluorescence contained in the light 176 reflected from the clothes 90 causes the clothes 90 to appear pure white. By contrast, for illumination at a display shelf 178, a display cabinet visible LED light 180 is arranged over it which emits only visible light downward; in addition, the display shelf 178 is formed of an ultraviolet transmitting material, and on the reverse (bottom) side of it, a display cabinet ultraviolet LED light 182 which emits ultraviolet light upward is arranged. Whereas the display cabinet visible LED light 180 is lit no matter what type of clothes 184 is placed on the display shelf 178, the display cabinet ultraviolet LED light 182 is lit only when the clothes 184 placed on the display shelf 178 is white.

With the configuration described above, when the clothes 184 placed on the display shelf 178 are white, for visible light, the illumination light from the display cabinet visible LED light 180 produces reflected light 186, and in addition, the fluorescence contained in the transmitted light 188 from the display cabinet ultraviolet LED light 182 causes the clothes 184 to appear pure white.

In Example 6 shown in FIG. 6, part of the display cabinet 172 is separated by a partition 190 to form a hanger compartment, where clothes 194 are hung on a hanger 192. Over the hanger compartment, a display cabinet visible LED light 196 is arranged which emits only visible light downward; in addition, the hanger 192 is formed of an ultraviolet transmitting material, and inside it, a display cabinet ultraviolet LED light 198 is arranged which emits ultraviolet light outward. Whereas the display cabinet visible LED light 196 is lit no matter what type of clothes 194 is hung on the hanger 192, the display cabinet ultraviolet LED light 198 inside the hanger 192 is lit only when the clothes 194 hung there are white.

With the configuration described above, when the clothes 194 hung on the hanger 192 are white, for visible light, the illumination light from the display cabinet visible LED light 196 produces reflected light 200, and in addition the fluorescence contained in the transmitted light 202 from the display cabinet ultraviolet LED light 198 causes the clothes 194 to appear pure white.

A sub-CPU 204 in the display cabinet controller 174 controls switches 36, 206, 210, and 212 individually according to operation on the operation panel 38, or signals received by the transmitter-receiver 42, or detection by unillustrated IC tag readers. The switch 36 is controlled in a similar manner as in Example 4. The switches 206 and 210 are turned on and off according to whether illumination is needed or not, irrespective of the type of clothes 184 and 194. On the other hand, the switches 208 and 212 are, under the condition that the switches 206 and 210 are on, turned off when the clothes 184 and 194 are colored and turned on when the clothes 184 and 194 are white.

EXAMPLE 7

Figure 7:
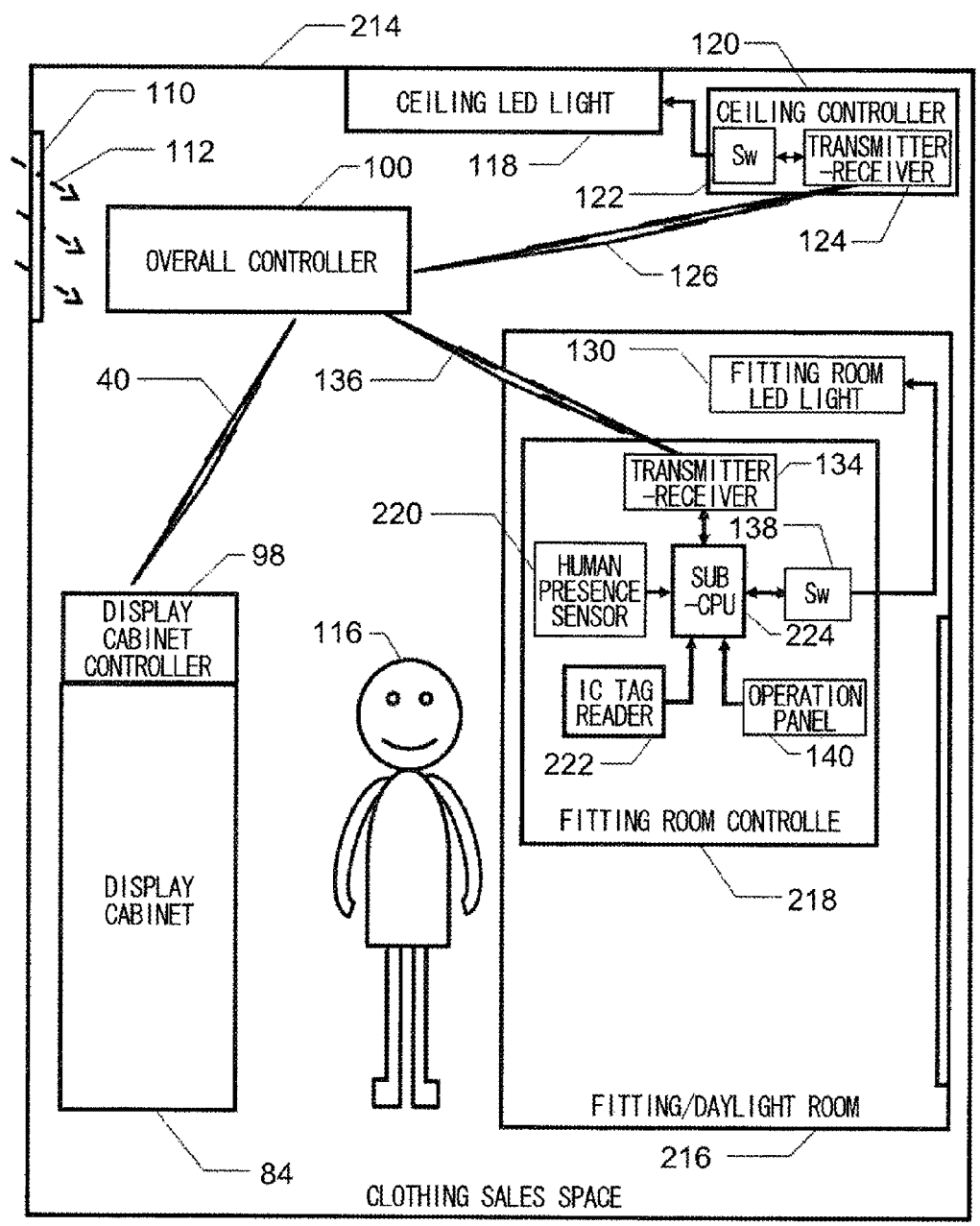
FIG. 7 is a block diagram of a clothing illumination system according to Example 7 of the present invention.

FIG. 7 is a block diagram of a seventh example (Example 7) of the present invention, and shows a clothing illumination system similar to those of Examples 4 to 6 shown in FIGS. 4 to 6. The clothing sales space 214 in Example 7 shown in FIG. 7 has much in common with the clothing sales space 82 in Example 4 shown in FIG. 4, and accordingly such parts as are common to them are identified by common reference signs, and no overlapping description will be repeated unless necessary. Moreover, the overall controller 100, the display cabinet 84, and the display cabinet controller 98 are configured to have the same details as described previously, and accordingly, in FIG. 7, the blocks inside them are omitted from illustration.

Example 7 shown in FIG. 7 differs from Example 4 in FIG. 4 in that a fitting room controller 218 is provided with a human presence sensor 220 so that, when a customer 116 enters a fitting/daylight room 216, a sub-CPU 224 controls the switch 138 to automatically turn on the fitting room LED light 130. In addition, the fitting room controller 218 is provided with an IC tag reader 222, and discriminates whether or not a piece of clothing that the customer 116 takes into the fitting/daylight room 216 is white. Responding to the IC tag reader 222, the sub-CPU 224, when the piece of clothing taken in is white, controls the switch 138 such that the fitting room LED light 130 emits both visible and ultraviolet light.

Moreover, when the human presence sensor 220 detects the customer 116, who picked up the white piece of clothing from the display cabinet 84 and moved across the clothing sales space 214, to have entered the fitting/daylight room 216, a report signal 136 is transmitted from the transmitter-receiver 134 to the overall controller 100. In response, the overall controller 100 transmits an instruction signal 126 to the transmitter-receiver 124 in the ceiling controller 120 to control the switch 122 such that the ceiling LED light 118 is switched, if it is emitting both visible and ultraviolet light, to visible light only.

EXAMPLE 8

Figure 8:
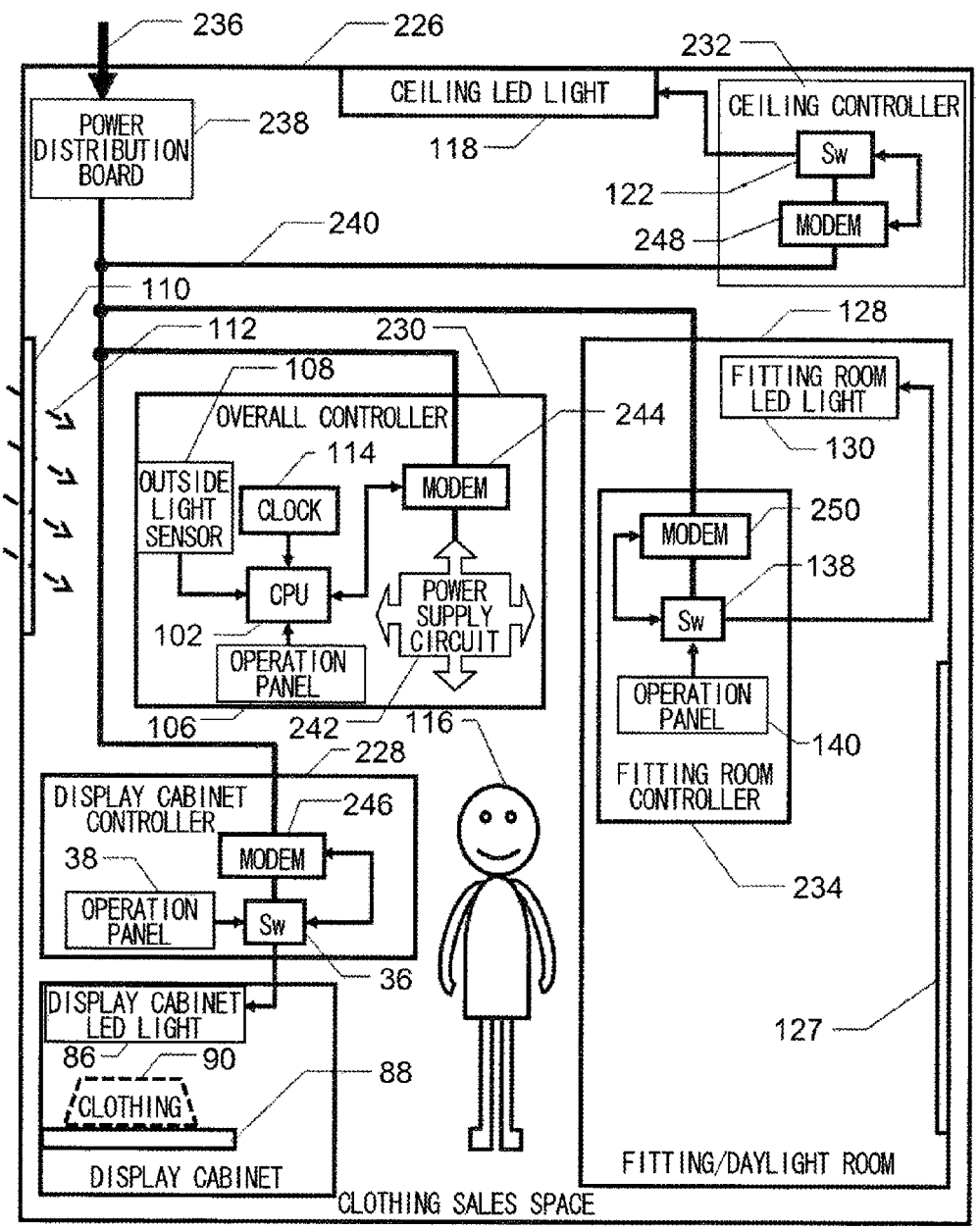
FIG. 8 is a block diagram of a clothing illumination system according to Example 8 of the present invention.

FIG. 8 is a block diagram of Example 8 of the present invention, and shows a clothing illumination system similar to those of Examples 4 to 7 shown in FIGS. 4 to 7. The clothing sales space 226 in Example 8 shown in FIG. 8 has much in common with the clothing sales space 82 in Example 4 shown in FIG. 4, and accordingly such parts as are common to them are identified by common reference signs, and no overlapping description will be repeated unless necessary.

The Example 8 shown in FIG. 8 differs from Example 4 shown in FIG. 4 in the means of coordination among individual controllers. Specifically, in Example 4 shown in FIG. 4, coordination among individual controllers 98, 100, 120, and 132 in the clothing sales space 82 is achieved by bidirectional wireless signals 40, 126, and 136 exchanged among transmitter-receivers 42, 104, 124, and 134. By contrast, in Example 8 shown in FIG. 8, coordination among individual controllers 228, 230, 232, and 234 in the clothing sales space 226 is achieved by power line communication (PLC). Though omitted from description in connection with up to Example 7 shown in FIG. 7, a power line 236 is led into the clothing sales space 226 to reach a power distribution board 238, and electric power is supplied via an indoor power cable 240 to different destinations in the clothing sales space 226. Moreover, PLC modems 244, 246, 248, and 250 are provided at relevant places in the clothing sales space 226 to achieve coordination by power line communication across the indoor power cable 240.

Specifically, a power supply circuit 242 which supplies electric power to different parts of an overall controller 230 is connected via the PLC modem 244 to the indoor power cable 240. By the signal splitting/mixing function of the PLC modem 244, the CPU 102 receives communication signals across the indoor power cable 240. Likewise, switches 36, 122, and 138 in a display cabinet controller 228, a ceiling controller 232, and a fitting room controller 234 are respectively connected via the PLC modems 246, 248, and 250 to the indoor power cable 240. By the signal splitting/mixing function of the PLC modems 246, 248, and 250, those controllers exchange communication signals across the indoor power cable 240 to communicate with the CPU 102 in the overall controller 230.

EXAMPLE 9

Figure 9:
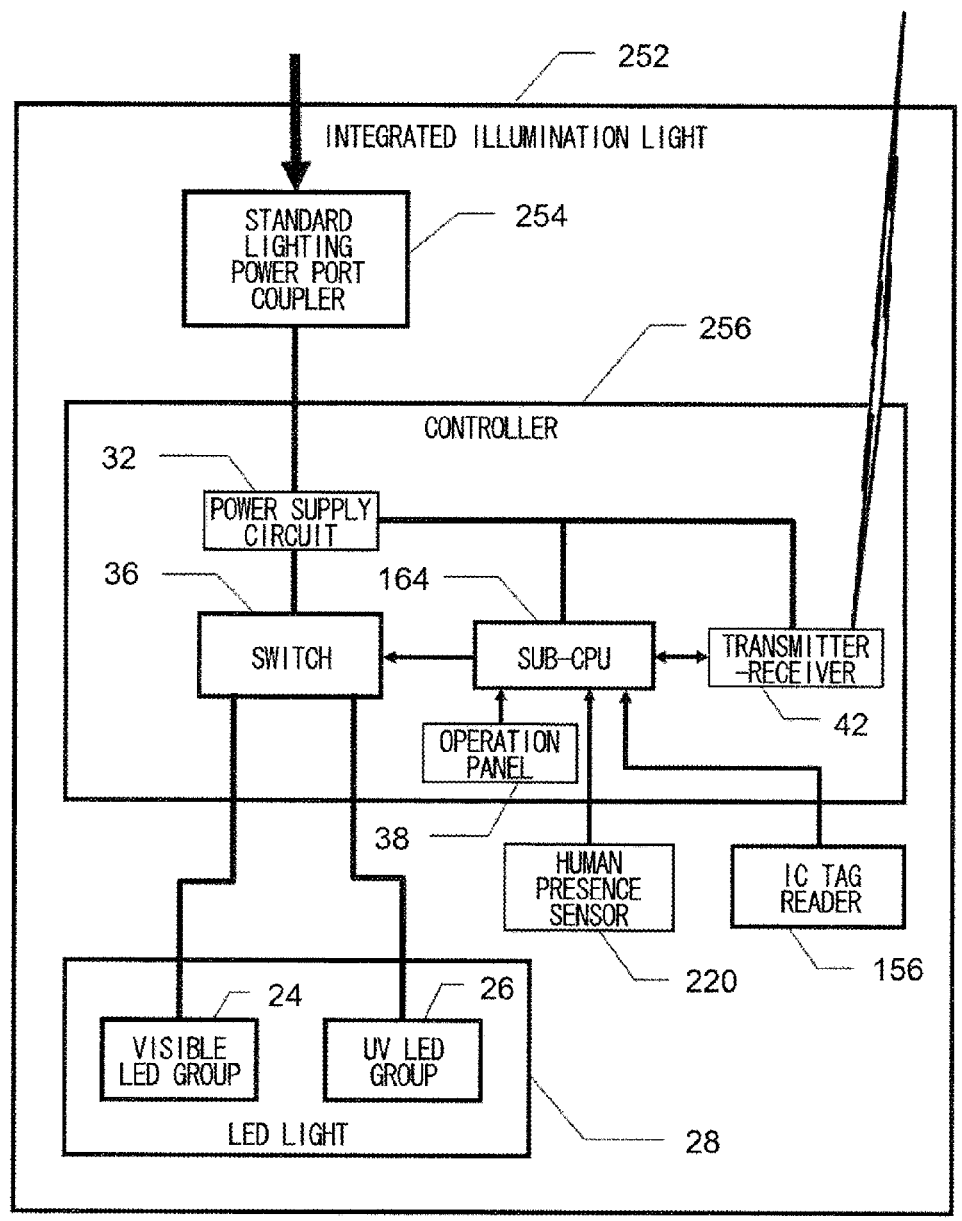
FIG. 9 is a block diagram of an integrated illumination light according to Example 9 of the present invention.

FIG. 9 is a block diagram of a ninth example (Example 9) of the present invention, and shows an integrated illumination light 252 which can be used in the clothing illumination systems described as Examples 4 to 7 shown in FIGS. 4 to 7. Individual parts in Example 9 shown in FIG. 9 have much in common with the corresponding parts in Examples 4 to 7 shown in FIGS. 4 to 7, and accordingly such parts as find their counterparts in the previous examples are identified by common reference signs, and no overlapping description will be repeated unless necessary. Example 9 is configured as a lighting fitting that has integrated, into an LED light, a controller, communication functions, a human presence sensor, and functions of an IC tag reader as described in Examples 4 to 7, and is designed to realize the functions of a clothing sales space as described in connection with Examples 4 to 7 when simply coupled to a standard power supply port for lighting fittings.

Specifically, the integrated illumination light 252 has a coupler 254 for coupling to a standard power supply port for lighting fittings, and this coupler 254 is connected to a power outlet, a power socket, a replacement lamp receptacle in a lighting fitting, or the like. The power outlet, power socket, replacement lamp receptacle in a lighting fitting, or the like may be one that is existing in a display cabinet, on a ceiling, in a fitting room, etc. in a clothing sales space. As mentioned above, the integrated illumination light 252 has integrated into an LED light 28 a controller 256 including a transmitter-receiver 42 and in addition a human presence sensor 220 and an IC tag reader 156. Thus, it realizes, with respect to illumination in different parts of the clothing sales space, functions as described in connection with Examples 4 to 7 when simply coupled to an existing power supply port.

EXAMPLE 10

Figure 10:
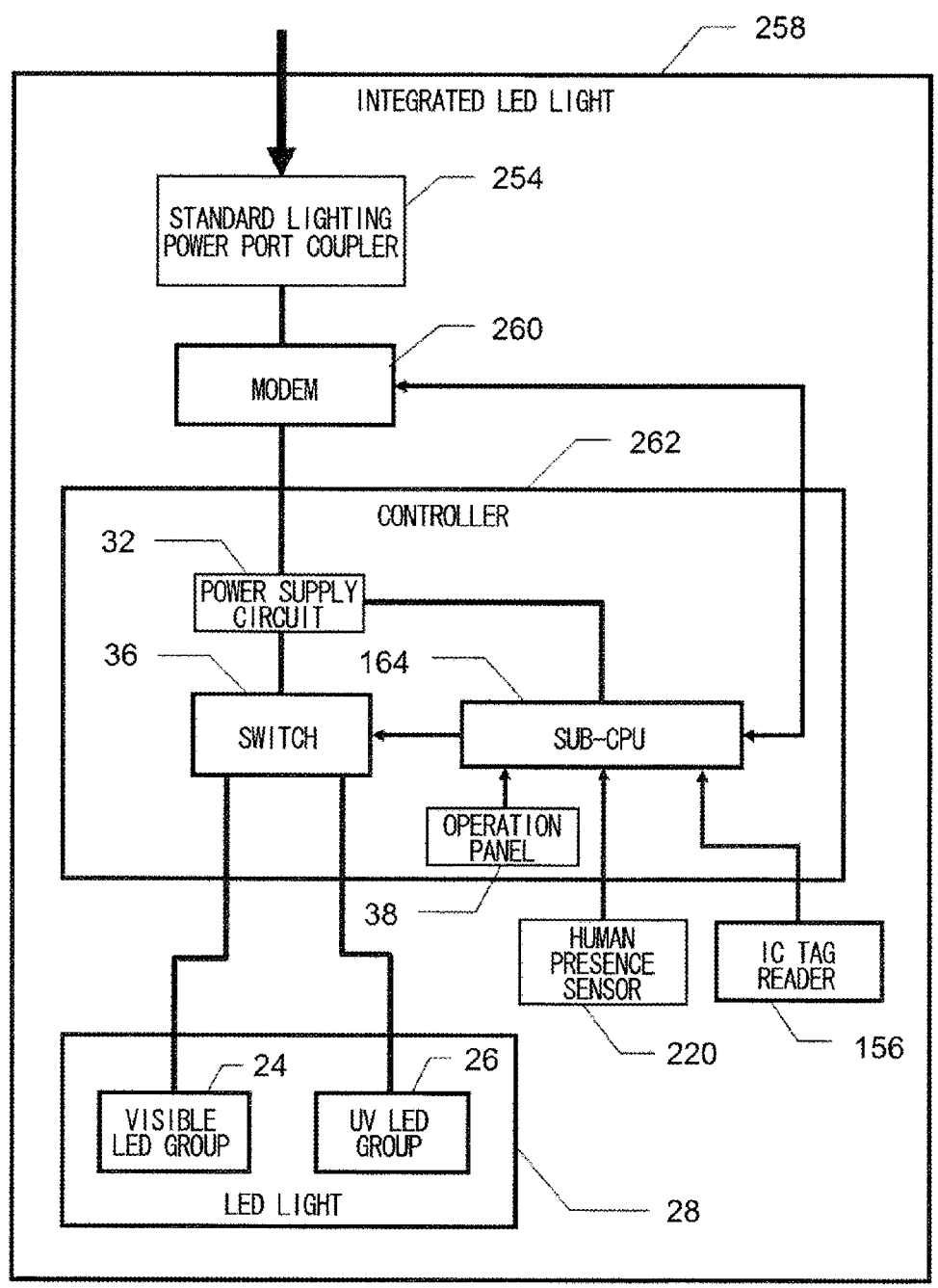
FIG. 10 is a block diagram of an integrated illumination light according to Example 10 of the present invention.

FIG. 10 is a block diagram of a tenth example (Example 10) of the present invention, and shows an integrated LED light 258 that can be used in the clothing illumination system described as Example 8 shown in FIG. 8. Individual parts in Example 10 shown in FIG. 10 have much in common with the corresponding parts in Examples 8 and 9 shown in FIGS. 8 and 9, and accordingly such parts as find their counterparts in the previous examples are identified by common reference signs, and no overlapping description will be repeated unless necessary. Example 10 is configured as a lighting fitting that has integrated, into an LED light, a controller, communication functions, a human presence sensor, and functions of an IC tag reader as described in Example 8, and is designed to realize the functions of a clothing sales space as described in connection with Example 8 when simply coupled to a standard power supply port for lighting fittings. A difference from Example 9 is that the configuration here assumes communication functions by power line communication.

Specifically, as in Example 9, the integrated illumination light 258 has a coupler 254 for coupling to a standard power supply port for lighting fittings, and this coupler 254 is connected to a power outlet, a power socket, a replacement lamp receptacle in a lighting fitting, or the like. As mentioned above, the integrated illumination light 258 has integrated into an LED light 28 a controller 262, a PLC modem 260, a human presence sensor 220, and an IC tag reader 156. Thus, it realizes, with respect to illumination in different parts of the clothing sales space, coordinated functions as described in connection with Example 8 when simply coupled to an existing power supply port.

Figure 11:
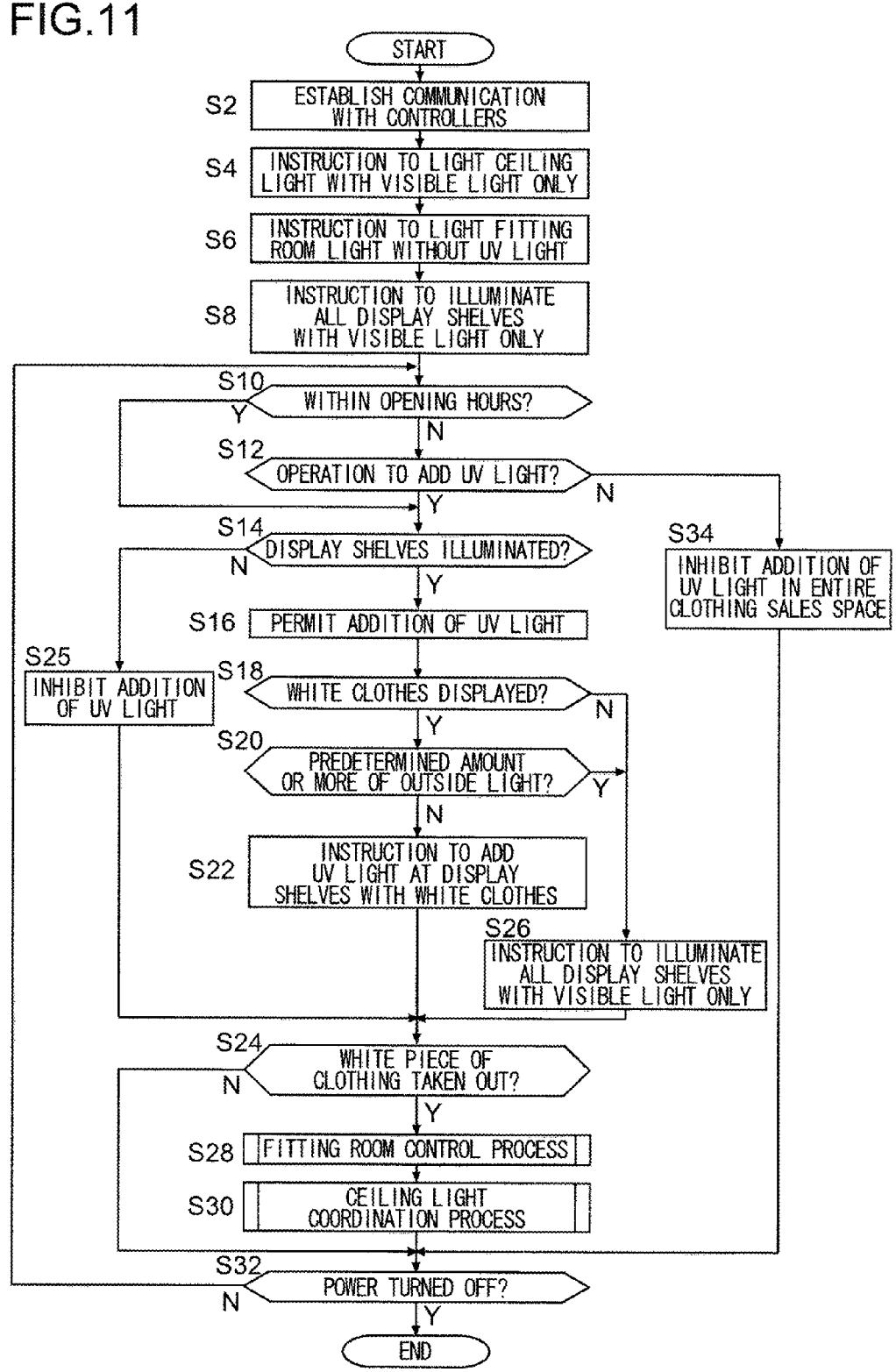
FIG. 11 is a flow chart showing the operation of an overall controller used in Examples 4 to 8 shown in FIGS. 4 to 8.

FIG. 11 is a flow chart showing the operation of the CPU 102 in the overall controller 100 used in Examples 4 to 8 shown in FIGS. 4 to 8. The flow starts when the power to the overall controller 100 is turned on. First, at step S2, communication with other controllers is established. Then, at step S4, an instruction to light the ceiling LED light 118 with visible light only is issued. Next, at step S6, an instruction to light the fitting room LED light 130 with daylight without ultraviolet light is issued. Subsequently, at step S8, an instruction to light all display cabinet LED lights in all display cabinets is issued, and then an advance is made to step S10.

At step S10, it is checked whether the current time falls within the opening hours of the clothing sales space 82 or the like, or before the start of or after the end of the opening hours. If the current time falls outside the opening hours, an advance is made to step S12, where it is checked whether or not a manual operation has been made to add ultraviolet light to the light emitted from the LED lights. If such an operation has been made, an advance is made to step S14. Also if, at step S10, the current time is found to falls within the opening hours, an advance is made to step S14.

At step S14, whether or not the display cabinets are illuminated is checked. If they is found to be illuminated, an advance is made to step S16, where addition of ultraviolet light is permitted, and then an advance is made to step S18. Step S14 just mentioned is provided to prevent ultraviolet light from being emitted while no visible light is being emitted. This is useful, in particular, to prevent the inconvenience of an ultraviolet LED alone being lit inadvertently as in a configuration where a visible LED and an ultraviolet LED are arranged at a distance from each other like the display cabinet visible LED light 180 and the display cabinet ultraviolet LED light 182, or the display cabinet visible LED light 196 and the display cabinet ultraviolet LED light 198, in Example 6 shown in FIG. 6. It should be noted that, at the time point that step S16 is reached, addition of ultraviolet light is not executed; it is simply permitted beforehand in preparation for an instruction to add ultraviolet light that may be issued based on a function performed later.

At step S18, it is checked whether there is any display shelf on which white clothes are displayed. This check can be made based on, for example, information from the IC tag reader 156 in Example 5 shown in FIG. 5. It can instead be made based on a control history of the overall controller 100 itself It can also be made based on operation on the operation panel 38 such as the display cabinet controller 146. When it is found that there is a display shelf on which white clothes are displayed, an advance is made to step S20, where whether or not a predetermined amount or more of outside light 112 is shining into the clothing sales space 82 or the like is checked based on the output of the outside light sensor 108 shown in FIG. 4. If less than the predetermined amount of outside light is shining in, an advance is made to step S22, where an instruction is issued to add ultraviolet light to the LED light for the display shelf where white clothes are displayed, and an advance is made to step S24.

By contrast, if, at step S18, it is found that there is no display shelf on which white clothes are displayed, or if, at step S20, the predetermined amount or more of outside light is shining into the clothing sales space 82 or the like, an advance is made to step S26, where an instruction to light all LED lights of all display shelves with visible light only is issued, and an advance is made to step S24. In this way, even when there is a display cabinet where white clothes are displayed, if the predetermined amount or more of outside light is shining in, the display cabinet LED lights of all display cabinets are lit with visible light only. Incidentally, if at step S14, no display shelf is found to be illuminated, no process for addling ultraviolet light is performed from the beginning, but, at step S25, addition of ultraviolet light is inhibited with respect to all display shelve, and an advance is made to step S24.

At step S24, it is checked whether or not any white piece of clothing has been taken out of white clothes displayed on a display shelf This check can be made based on, for example, information from the IC tag reader 156 in Example 5 shown in FIG. 5. If, at step S24, it is found that a white piece of clothing has been taken out from a display shelf, it follows that the white piece of clothing is in the illumination range of the ceiling LED light 118 or is being tried on in the fitting/daylight room 128; accordingly, a fitting room control process at step S28 and a ceiling light coordination process at step S30 are performed, and an advance is made to step S32. These processes will be described in detail later. Incidentally, if, at step S24, no white piece of clothing is found to have been taken out from a display shelf, a direct advance is made to step S32.

On the other hand, if, at step S10, the current time is found to be outside the opening hours of the clothing sales space 82 or the like, and in addition, at step S12, no manual operation for addition of ultraviolet light has been made, then an advance is made to step S34, where addition of ultraviolet light is inhibited with respect to all LED lights in the entire clothing sales space, and an advance is made to step S32. In this way, it is possible to prevent unnecessary addition of ultraviolet light outside the opening hours, and to prevent clothes from fading. By contrast, as mentioned previously, by performing a manual operation at step S12, even before the start of or after the end of the opening hours, it is possible to test how white clothes are illuminated on display shelves with ultraviolet light added, to test-run the fitting room control process at step S28, to test-run the ceiling light coordination process at step S30, etc.

At step S32, whether or not the power to the overall controller 100 has been turned off is checked, and if the power is found not to have been turned off, a return is made to step S10. Subsequently, unless the power is found to have been turned off, steps S10 through S34 are repeated to cope with various changes in situation. By contrast, if, at step S32, the power to the overall controller 100 is found to have been turned off, the flow ends.

Figure 12:
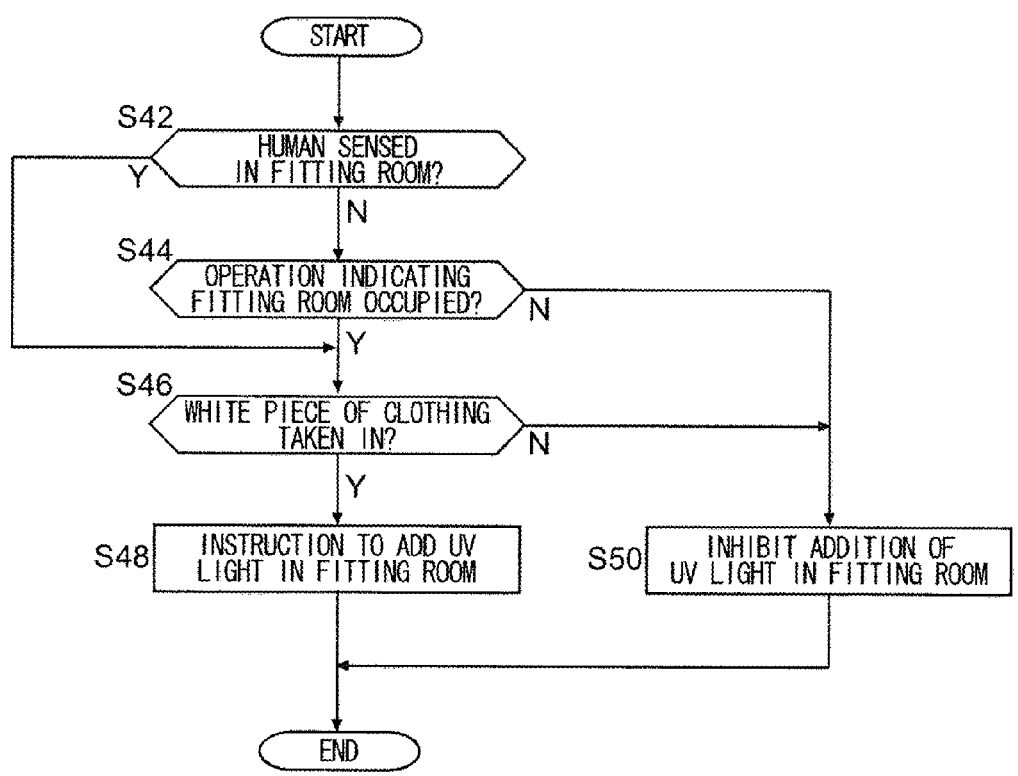
FIG. 12 is a flow chart showing the details of step S28 in FIG. 11.

FIG. 12 is a flow chart showing the details of the fitting room control process at step S28 in FIG. 11. When the flow starts, at step S42, whether or not a person is present in the fitting/daylight room 216 is checked with the human presence sensor 220 shown in FIG. 7. If the human presence sensor 220 detects no person, an advance is made to step S44, where whether or not the operation panel 140 is being operated is checked. If it is being operated, it follows that the fitting/daylight room 216 is occupied. Incidentally, as previously mentioned, the operation panel 140 has the function of allowing manually switching whether or not to add ultraviolet light; FIG. 12, however, illustrates the function of automatic switching, and the operation of the operation panel 140 exploited here is its function of, as mentioned above, simply indicating outward whether the fitting/daylight room 216 is occupied or vacant.

If, at step S44, an operation indicating that the fitting/daylight room 216 is occupied is recognized, an advance is made to step S46. If, at step S42, the human presence sensor 220 finds that a person is present in the fitting/daylight room 216, a direct advance is made to step S46. At step S46, whether or not a white piece of clothing has been taken into the fitting/daylight room 216 is checked. This check is possible by, for example, the IC tag reader 222 shown in FIG. 7 or the like.

If, at step S46, it is found that a white piece of clothing has been taken into the fitting/daylight room 216, an advance is made to step S48, where an instruction to add ultraviolet light to the illumination by the fitting room LED light 130 is issued, and the flow ends. By contrast, if, at step S46, no white piece of clothing is found to have been taken into the fitting/daylight room 216, an advance is made to step S50, where addition of ultraviolet light to the illumination by the fitting room LED light 130 is inhibited, and the flow ends. Also if, at step S44, no operation indicating that the fitting/daylight room 216 is occupied is recognized, an advance is made to step S50, where addition of ultraviolet light to the illumination by the fitting room LED light 130 is inhibited, and the flow ends.

On completion of the flow shown in FIG. 12, an advance is made to step S30 in the flow shown in FIG. 11. As mentioned above, unless the power is found to have been turned off, steps S10 through S34 in FIG. 11 are repeated; during the repetition, every time step S28 is reached, the flow shown in FIG. 12 is executed so that whether or not to add ultraviolet light is switched automatically according to changes in situation.

Figure 13:
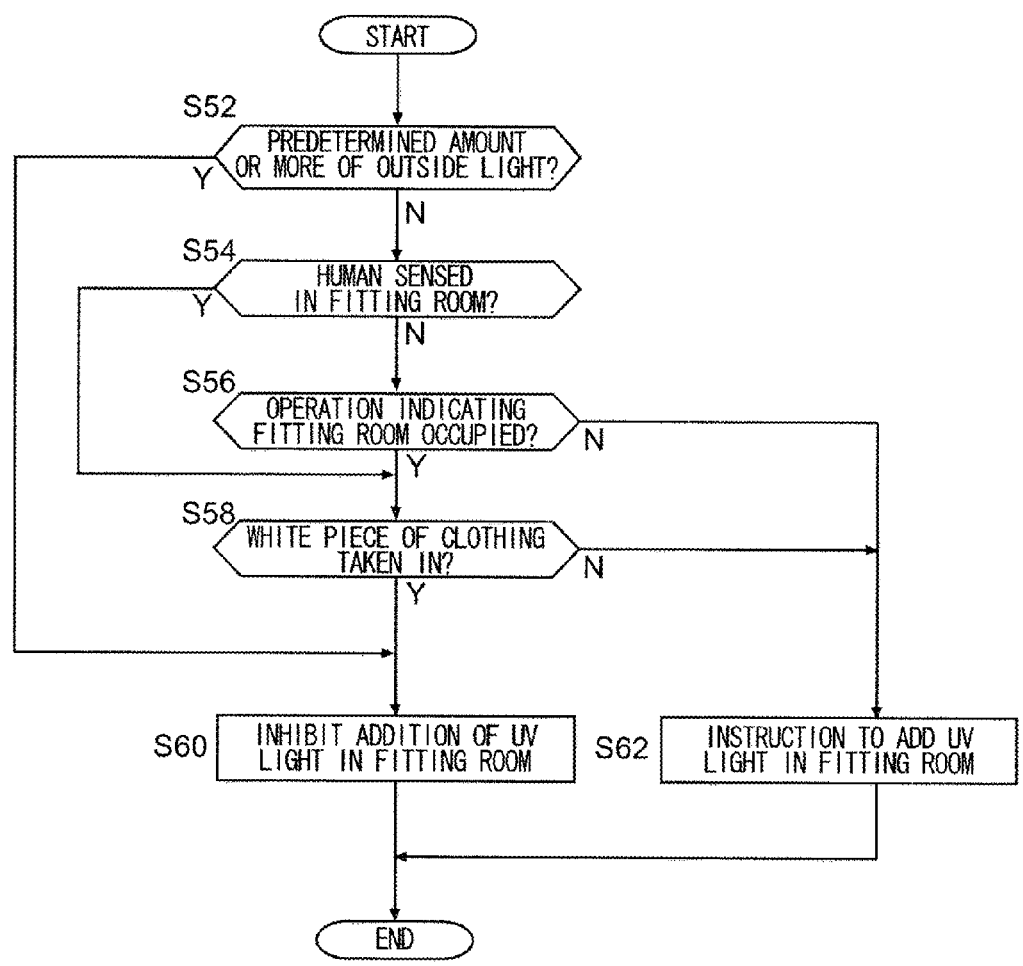
FIG. 13 is a flow chart showing the details of step S30 in FIG. 11.

FIG. 13 is a flow chart showing the details of the ceiling light coordination process at step S30 in FIG. 11. When the flow starts, first, at step S52, based on the output of the outside light sensor 108 shown in FIG. 4, whether or not a predetermined amount or more of outside light is shining into the clothing sales space 82 or the like is checked. If less than the predetermined amount of outside light is shining in, an advance is made to step S54, where whether or not a person is present in the fitting/daylight room 216 is checked with the human presence sensor 220. If, at step S54, the human presence sensor 220 detects no person, an advance is made to step S56, where, as in step S44 in FIG. LED group 12, whether or not the operation panel 140 is being operated is checked.

If, at step S56, an operation indicating that the fitting/daylight room 216 is occupied is recognized, an advance is made to step S58. If, at step S54, the human presence sensor 220 recognizes that a person is present in the fitting/daylight room 216, a direct advance is made to step S58. At step S58, whether or not a white piece of clothing has been taken into the fitting/daylight room 216 is checked.

If, at step S58, a white piece of clothing is found to have been taken into the fitting/daylight room 216, an advance is made to step S60, where addition of ultraviolet light to the illumination by the ceiling LED light 118 is inhibited, and the flow ends. This corresponds to turning off the ultraviolet light from the ceiling LED light 118 in a case where the ultraviolet light added, through a function described later, to the illumination by the ceiling LED light 118 to illuminate a white piece of clothing taken out from a display shelf thereafter becomes unnecessary as a result of the white piece of clothing being taken into the fitting/daylight room 216. Incidentally, if, at step S52, the predetermined amount or more of outside light is detected, even when a white piece of clothing is taken out from a display shelf, no ultraviolet light needs to be added to the illumination by the ceiling LED light 118, and thus a direct advance is made to step S60, where addition of ultraviolet light to the illumination by the ceiling LED light 118 is inhibited, and the flow ends.

On the other hand, if, at step S58, no white piece of clothing is found to have been taken into the fitting/daylight room 216, an advance is made to step S62, where an instruction to add ultraviolet light to the illumination by the ceiling LED light 118 is issued, and the flow ends. In this case, it is assumed that the piece of clothing that has been taken into the fitting/daylight room 216 is colored, whereas the piece of clothing that has been taken out from a display shelf by another customer is still under the illumination by the ceiling LED light 118. Also if, at step S56, no operation indicating that the fitting/daylight room 216 is occupied is recognized, an advance is made to step S62, where an instruction to add ultraviolet light to the illumination by the ceiling LED light 118 is issued, and the flow ends. This is because, also in this case, it is assumed that the customer who has taken out the white piece of clothing from the display shelf has not yet reached the fitting/daylight room 216 and that the white piece of clothing still is still the illumination by the ceiling LED light 118.

On completion of the flow shown in FIG. 13, an advance is made to step S32 in the flow shown in FIG. 11. As mentioned previously, unless the power is found to have been turned off, steps S10 through S34 in FIG. 11 are repeated; during the repetition, every time step S30 is reached, the flow shown in FIG. 13 is executed so that whether or not to add ultraviolet light to the illumination by the ceiling LED light 118 is switched automatically in a fashion coordinated with the control of illumination in the fitting/daylight room 216.

The present invention may be implemented in any other manners than specifically described above by way of examples; even then, the benefits of the present invention mentioned above are available. For example, although the flow chart shown in FIG. 11 has been described as showing the operation of the CPU 102 in the overall controller 100, part of the involved functions may be distributed to other controllers. Specifically, the functions for controlling LED lights for display cabinets may be distributed to the sub-CPU 164 in the display cabinet controller 146 in Example 5 shown in FIG. 5 or the sub-CPU 204 in the display cabinet controller 174 in Example 6 shown in FIG. 6. Likewise, the functions for controlling the fitting room LED light 130 may be distributed to the sub-CPU 224 in the fitting room controller 218 in Example 7 shown in FIG. 7. In cases where functions are distributed as just mentioned, the CPU 102 in the overall controller 100 and the individual sub-CPUs operate in a coordinated fashion while exchanging information with one another.

Conclusion

To follow is a summary of the various features of the clothing illumination devices and clothing illumination systems disclosed in the present specification.

According to features disclosed in the present specification, a clothing illumination device is provided which is configured to be capable of switching between illumination with visible light only and illumination with visible light mixed with ultraviolet light. This makes it possible to illuminate colored clothes with visible light only to prevent them from fading, and to illuminate white clothes containing fluorescent agents with visible light mixed with ultraviolet light.

According to a specific feature, a clothing illumination device of the present invention includes an LED light source capable of emitting visible light and ultraviolet light, and a filter device capable of switching whether or not to cut an ultraviolet component of the LED light source. According to a more specific feature, the filter device can switch whether to place a first filter, which transmits visible light only, or a second filter, which transmits visible and ultraviolet light, in the optical path of the LED light source. According to another more specific feature, the filter device can switch whether or not to place a filter that cuts ultraviolet light in the optical path of the LED light source.

According to another specific feature, a clothing illumination device of the present invention includes a first LED light source capable of emitting visible light only, and a second LED light source capable of emitting ultraviolet light, and is configured to be capable of switching whether or not to emit ultraviolet light from the second LED light source. According to a more specific feature, the mix ratio of the illumination light from the first LED light source and the illumination light from the second LED light source can be varied. According to another more specific feature, the second LED light source is capable of emitting ultraviolet light only. According to yet another more specific feature, the second LED light source is capable of emitting visible light and ultraviolet light.

According to another specific feature of the present invention, the first LED light source is arranged so as to illuminate the obverse side of clothing, and the second LED light source is arranged so as to illuminate the clothing from behind. According to a more specific feature, the second LED light source is arranged on the reverse side of a display shelf According to another more specific feature, the second LED light source is arranged in a hanger for clothing.

According to another specific feature, a clothing illumination device of the present invention is provided with communication functions. This permits it, when simply connected to an existing socket, outlet, or any other power source for lighting, to provide illumination in different parts of a clothing sales space in a coordinated fashion. According to a more specific feature, the communication functions are realized by power line communication.

According to another specific feature, a clothing illumination device of the present invention includes an IC tag reader. This makes it possible to discriminate the type of clothes in the illumination range, and to provide illumination suitable for them.

According to another specific feature, a clothing illumination device of the present invention includes a human presence sensor. This makes it possible to prevent unnecessary emission of ultraviolet light, and to prevent clothes from fading.

According to another feature of the present invention, a clothing illumination device is provided which includes an LED light source and an IC tag reader. This makes it possible to discriminate the type of clothes in the illumination range, and to provide illumination suitable for them by controlling the LED light source.

According to yet another feature of the present invention, a clothing illumination device is provided which is configured to be capable of switching between illumination with visible light only and illumination with visible light mixed with ultraviolet light, and capable of inhibiting illumination with ultraviolet light only. This makes it possible to prevent inadvertent illumination with ultraviolet light only from being continued unnoticed.

According to a specific feature of the present invention, an outside light detector is provided, and switching between illumination with visible light only and illumination with visible light mixed with ultraviolet light is done based on the outside light detector. This makes it possible to prevent unnecessary illumination with visible light mixed with ultraviolet light when natural outside light containing ultraviolet light is shining in.

According to another specific feature, switching between illumination with visible light only and illumination with visible light mixed with ultraviolet light is done according to time zone. This makes it possible to prevent clothes from fading due to unnecessary emission of ultraviolet light in a time zone outside the opening hours when no customer is present.

According to another specific feature, switching between illumination with visible light only and illumination with visible light mixed with ultraviolet light is done according to where a piece of clothing to be illuminated is located. This makes it possible to provide illumination while coping with a customer moving around with a white piece of clothing.

According to another feature of the present invention, a clothing illumination system is provided which includes a first clothing illumination device configured to be capable of switching between illumination with visible light only and illumination with visible light mixed with ultraviolet light, and a second clothing illumination device configured to be capable of switching between illumination with visible light only and illumination with visible light mixed with ultraviolet light, and here the first and second clothing illumination devices operate in a fashion coordinated with each other to perform the switching. This makes it possible to properly cope with varying situations in a clothing sales space.

According to a specific feature, when the first clothing illumination device illuminates with visible light mixed with ultraviolet light, the second clothing illumination device illuminates with visible light only. With this configuration, when a white piece of clothing is taken to under the second clothing illumination device, it is possible to prevent the first clothing illumination device from adding ultraviolet light unnecessarily. For example, the first clothing illumination device is a ceiling illumination device, and the second clothing illumination device is an illumination device for a fitting room. According to a more specific feature, when a white piece of clothing is taken out to under the first clothing illumination device, the first clothing illumination device is switched from illumination with visible light only to illumination with visible light mixed with ultraviolet light, and when the fitting room is occupied, the first clothing illumination device is switched from illumination with visible light mixed with ultraviolet light to illumination with visible light only. According to another more specific feature, when the fitting room is occupied, if the piece of clothing taken into the fitting room is not white, illumination by the first clothing illumination device with visible light mixed with ultraviolet light is continued.

According to another specific feature, when a white piece of clothing under illumination by the first clothing illumination device illuminating with visible light mixed with ultraviolet light is taken out to under illumination by the second clothing illumination device, the second clothing illumination device is switched from illumination with visible light only to illumination with visible light mixed with ultraviolet light. This makes it possible to provide illumination while coping with a customer moving around with a white piece of clothing. For example, the first clothing illumination device is an illumination device for a display shelf, and the second clothing illumination device is a ceiling illumination device.

According to another specific feature, an outside light detector is provided, and when the outside light detector detects a predetermined amount or more of outside light, illumination by the second clothing illumination device with visible light only is continued. According to yet when the current time is outside the opening hours, illumination by the second clothing illumination device with visible light only is continued. With these configurations, it is possible to prevent ultraviolet light from being added unnecessarily.

While the best mode of the present invention has been discussed above, it is apparent to those skilled in the art that the disclosed invention allows for many modifications and can be implemented in many different ways other than specifically described above by way of examples. Accordingly, the appended claims are to be understood to encompass any variations possible within the scope not departing from the spirit and technical perspective of the present invention.

INDUSTRIAL APPLICABILITY

The present invention find applications in clothing illumination devices and clothing illumination systems.

LIST OF REFERENCE NUMERALS

12 LED light source
6 filter device
14 first filter
16 second filter
24, 46 first LED light source
26, 48 second LED light source
178 display shelf
192 hanger
42, 260 communication function
42 wireless communication function
260 power line communication function
156 IC tag reader
220 human presence sensor
86, 92, 100, 118, 130, 146, 174, 230 display cabinet illumination device
108 outside light detector
82, 142, 214, 226 clothing illumination system
128 fitting room
118, 120 ceiling illumination device
88, 94, 178 display shelf

What is claimed is:

1. A clothing illumination system comprising:
a clothing sales space for clothes treated with fluorescent agents;
a light source operable to emit visible light and ultraviolet light; and
a controller configured to cause the light source to switch between illumination of the clothes with the visible light only and illumination of the clothes with the visible light mixed with the ultraviolet light for acting on the clothes treated with fluorescent agents.

2. The clothing illumination system according to claim 1, wherein the light source includes an LED light source capable of emitting visible light and ultraviolet light; and wherein the controller includes a filter device to control whether or not to cut an ultraviolet component of the LED light source.

3. The clothing illumination system according to claim 1, wherein the light source includes a first LED light source capable of emitting visible light only and a second LED light source capable of emitting ultraviolet light, and wherein the controller is configured to control whether or not to emit ultraviolet light from the second LED light source.

4. The clothing illumination system according to claim 3, wherein the second LED light source is capable of emitting visible light and ultraviolet light.

5. The clothing illumination system according to claim 3, wherein the first LED light source is arranged so as to illuminate the clothing from outside thereof, and the second LED light source is arranged so as to illuminate the clothing from inside thereof.

6. The clothing illumination system according to claim 1, wherein the controller is configured to control switching between illumination of colored clothes with visible light only and illumination of white clothes with visible light mixed with ultraviolet light for acting on fluorescent agents so that the white clothes appear pure white.

7. The clothing illumination system according to claim 1, wherein illumination with ultraviolet light only is inhibited.

8. The clothing illumination system according to claim 1 further comprising an outside light detector, wherein the controller is configured to control switching between illumination with visible light only and illumination with visible light mixed with ultraviolet light is done based on the outside light detector.

9. The clothing illumination system according to claim 1, wherein the controller is configured to control switching between illumination with visible light only and illumination with visible light mixed with ultraviolet light is done according to time zone.

10. The clothing illumination system according to claim 1, wherein the controller is configured to control switching between illumination with visible light only and illumination with visible light mixed with ultraviolet light is done according to where a piece of clothing to be illuminated is located in the clothing sales space.

11. The clothing illumination system according to claim 1, wherein the controller is configured to control switching between illumination with visible light only and illumination with visible light mixed with ultraviolet light is done according to condition of illumination by another clothing illumination device in the clothing sales space.

12. The clothing illumination system according to claim 1, comprising an IC tag reader to identify clothing.

13. The clothing illumination system according to claim 1 comprising a plurality of controllers and associated light sources operable to emit visible light and fluorescent light, wherein the controllers operate in a fashion coordinated with one another so as to individually switch between illumination with visible light only and illumination with visible light mixed with ultraviolet light in the clothing sales space for clothes treated with fluorescent agents.

14. A clothing illumination system comprising:
a clothing sales space;
an LED light source; and
an IC tag reader operable to identify clothing in the clothing sales space for controlling the LED light source for proper illumination of the clothing identified by the IC tag.

15. A clothing illumination system comprising:
a clothing sales space for clothes treated with fluorescent agents;
a first clothing illumination device operable to switch between illumination with visible light only and illumination with visible light mixed with ultraviolet light for acting on the clothes treated with fluorescent agents; and a second clothing illumination device operable to switch between illumination with visible light only and illumination with visible light mixed with ultraviolet light for acting on the clothes treated with fluorescent agents, wherein the first and second clothing illumination devices are both in the clothing sales space, and wherein the first and second clothing illumination devices operate in a fashion coordinated with each other to perform the switching in the clothing sales space for clothes treated with fluorescent agents.

16. The clothing illumination system according to claim 15, wherein, when the first clothing illumination device illuminates with visible light mixed with ultraviolet light for acting on the clothes treated with fluorescent agents, the second clothing illumination device illuminates with visible light only.

17. The clothing illumination system according to claim 15, wherein the first clothing illumination device is an illumination device for a fitting room, and the second clothing illumination device is a ceiling illumination device outside the fitting room, and wherein the first and second clothing illumination devices operate in a fashion coordinated with each other in accordance with movement of a customer in and out of the fitting room.

18. The clothing illumination system according to claim 15, wherein, when a white clothing under illumination by the first clothing illumination device illuminating with visible light mixed with ultraviolet light is taken out to under illumination by the second clothing illumination device, the second clothing illumination device is switched from illumination with visible light only to illumination with visible light mixed with ultraviolet light.

19. The clothing illumination system according to claim 18 further comprising an outside light detector, wherein, when the outside light detector detects a predetermined amount or more of outside light, illumination by the second clothing illumination device with visible light only is continued.

20. The clothing illumination system according to claim 18, wherein, when a current time is not in opening hours of the clothing sales space, illumination by the second clothing illumination device with visible light only is continued.

* * * * *